US005885736A

United States Patent [19]

Hirai

[11] Patent Number: 5,885,736

[45] Date of Patent: Mar. 23, 1999

[54] PREPARATION METHOD OF COLOR FILTER USING A SILVER HALIDE LIGHT SENSITIVE MATERIAL

[75] Inventor: Hiroyuki Hirai, Kanagawa, Japan

[73] Assignee: Fuji Photo Film Co., Ltd., Minami-ashigura, Japan

[21] Appl. No.: 651,908

[22] Filed: May 21, 1996

[30] Foreign Application Priority Data

| | | | |
|---|---|---|---|
| May 22, 1995 | [JP] | Japan | 7-122733 |
| Jul. 18, 1995 | [JP] | Japan | 7-181575 |

[51] Int. Cl.$^6$ .......... G02B 5/20

[52] U.S. Cl. .......... 430/7; 430/321

[58] Field of Search .......... 430/7, 321; 349/106

[56] References Cited

U.S. PATENT DOCUMENTS

| | | | |
|---|---|---|---|
| 4,386,145 | 5/1983 | Gilmour | 430/7 |
| 5,462,822 | 10/1995 | Roosen et al. | 430/7 |
| 5,576,127 | 11/1996 | Hirai et al. | 430/7 |

FOREIGN PATENT DOCUMENTS

| | | |
|---|---|---|
| 6151611 | 9/1994 | European Pat. Off. . |
| 662635 | 7/1995 | European Pat. Off. . |
| A-55-6342 | 1/1980 | Japan . |
| A-62-71950 | 4/1987 | Japan . |
| A-62-148952 | 7/1987 | Japan . |

*Primary Examiner*—John A. McPherson

*Attorney, Agent, or Firm*—Burns, Doane, Swecker & Mathis, LLP

[57] ABSTRACT

A silver halide light-sensitive material for color filter is disclosed, comprising a support having provided thereon at least three silver halide emulsion layers containing couplers and having color sensitivities different from each other and at least light-insensitive interlayer, wherein the total amount of the binder in the silver halide light-sensitive material is from 3 to 10 g/m$^2$, the equivalent ratio of silver halide to couplers in each silver halide emulsion layer is from 1 to 2, and the average grain size (in the case of tabular grains, determined by the thickness) in each silver halide emulsion is from 0.05 to 0.9 $\mu$m, or wherein the proportion of organic compounds other than polymers to all organic compounds in each silver halide emulsion layer is 55 % by weight or less. Also disclosed are a preparation method of a color filter using the silver halide light-sensitive material and a color filter prepared according to the method.

4 Claims, 3 Drawing Sheets

R Light Exposure

G Light Exposure

B Light Exposure

White Light Exposure

PREPARATION METHOD OF COLOR FILTER USING A SILVER HALIDE LIGHT SENSITIVE MATERIAL

FILED OF THE INVENTION

The present invention relates to a silver halide light-sensitive material suitable for the production of a color filter having red, green and blue areas excellent in the spectral transmission characteristics, small in the layer thickness and superior in the planeness, and to a method for preparing a color filter using the same. The present invention further relates to a silver halide light-sensitive material suitable for the simple production of a color filter having a high-density black area.

BACKGROUND OF THE INVENTION

The color filter is being used as a color face plate for a cathode-ray tube display, a photoelectric conversion device plate for copying, a filter for a single tube-type color television camera, a flat panel display using liquid crystal or a color solid pickup element.

The color filter in common use is constituted by primary colors of red, green and blue which are regularly disposed, however, some color filters are constituted by four or more color hues, if desired. For example, in case of a color filter for a camera tube or a color filter for a liquid crystal display, a black pattern (black matrix) is required for various purposes.

Specific examples of the disposition method of red, green and blue include a mosaic disposition, a stripe disposition and a delta disposition, and these disposition methods may be appropriately selected according to the need.

With respect to the method for producing a color filter, evaporation, dyeing, printing, pigment dispersion, electrodeposition, and electrodeposition transfer of a resist have been conventionally known. However, the color filter obtained by these methods is deficient in that a complicated production process is required, pinholes or flaws are readily generated, the yield is low, and accuracy is not ensured.

In order to overcome these problems, a method for producing a color filter according to an external development method (as described in, e.g., JP-A-55-6342, the term "JP-A" as used herein means an "unexamined published Japanese patent application") or an internal development method (as described in, e.g., JP-A-62-148952 and JP-A-62-71950), using a silver halide color light-sensitive material, have been investigated. In the former case, the color development must be performed at least three times, thus, the production process never be simple. In the latter case, the layer thickness increases and for example, in the production of LCD panel, the layer may be peeled off upon rubbing or breaking of the line may be readily caused. In particular, when a light-sensitive material comprising a large number of light-sensitive layers as described in Japanese Patent Application No. 6-155726 is used, the layer thickness is further increased and a measure must be taken therefor. In order to overcome these problems, it may be considered to reduce the coating amount of binder, however, if this is practiced, there arise problems such that mixing of colors is readily caused, the ratio of organic compounds having a low melting point relatively increases in the coated layers, and the dye produced readily diffuses at a high temperature to cause blurring of the pixel pattern. The color filter is, for example, in the case of use for a color liquid crystal display, obliged to come under a high temperature condition of 150° C. or higher in the after processing such as coating of a protective layer, deposition of a transparent electrode, and application of an orientation layer. Hence, the dye is required to have fastness to these temperatures and also to undergo no heat diffusion.

SUMMARY OF THE INVENTION

A first object of the present invention is to provide a color filter having red, green and blue areas, which is reduced in the layer thickness, low in the color turbidity and excellent in the spectral transmission characteristics.

A second object of the present invention is to provide a color filter which requires no complicated process, is suitable for the mass production, has a black area having a high optical density and difficultly causes defects even in the production process of an LCD panel.

A third object of the present invention is to provide a color filter reduced in the layer thickness and almost free from blurring of picture elements.

A fourth object of the present invention is to provide a color filter which requires no complicated process, is suitable for the mass production, difficultly causes defects even in the production process of an LCD panel, and has an excellent light transmission characteristics.

These and other objects of the present invention can be achieved by, as a first embodiment:

(1) a silver halide light-sensitive material for color filter comprising a support having provided thereon at least three silver halide emulsion layers containing couplers and having color sensitivities different from each other and at least light-insensitive interlayer, wherein the total amount of the binder in the silver halide light-sensitive material is from 3 to 10 g/$m^2$, the equivalent ratio of silver halide to couplers in each silver halide emulsion layer is from 1 to 2, and the average grain size of silver halide (in the case of tabular grains, determined by the thickness) in each silver halide emulsion is from 0.05 to 0.9 $\mu$m;

(2) a silver halide light-sensitive material for color filter as described in item (1), wherein at least one of the at least three silver halide emulsin layers having color sensitivities different from each other comprises silver halide emulsion having a silver chloride content of 90 mol % or more;

(3) a silver halide light-sensitive material for color filter as described in items (1) to (2), comprising a support provided thereon at least three silver halide emulsion layers having color sensitivities different from each other, wherein the silver halide emulsion layers contain couplers in combination so as to develop blue, green and red color upon coupling reaction of the couplers with the oxidation product of a developing agent.

(4) a silver halide light-sensitive material for color filter as described in item (3), which further comprises, in addition to the three silver halide emulsion layers having color sensitivities different from each other and corresponding to development of blue, green and red color, respectively, at least one silver halide emulsion layer having color sensitivity different from those of the three silver halide emulsion layers and containing a coupler capable of effecting color correction so that substantially black having a transmission density of 2.5 or more is exhibited when all couplers on the support are reacted; and (5) a method for preparing a color filter having a pixel pattern composed of blue, green and red colors, comprising subjecting a silver halide light-sensitive material described in any one of items (1) to (4) to pattern exposure, color development and desilvering.

Further, these and other objects of the present invention can be achieved by, as a second embodiment:

(6) a silver halide light-sensitive material for color filter comprising a support having provided thereon at least three silver halide emulsion layers containing couplers and having color sensitivities different from each other and at least one light-insensitive interlayer, wherein the proportion of organic compounds other than polymers to all organic compounds in each silver halide emulsion layer is 55% by weight or less;

(7) a silver halide light-sensitive material for color filter as described in item (6), wherein the proportion of organic compounds other than polymers to all organic compounds in the light-insensitive interlayer is 55% by weight or less and the total amount of a binder in the silver halide light-sensitive material is from 3 to 10 $g/m^2$;

(8) a silver halide light-sensitive material for color filter as described in item (6) or (7), comprising a support provided thereon at least three silver halide emulsion layers having color sensitivities different from each other, wherein the three silver halide emulsion layers contain couplers in combination so as to develop blue, green and red color upon coupling reaction of the couplers with the oxidation product of a developing agent.

(9) a silver halide light-sensitive material for color filter as described in any of items (6) to (8), which further comprises, in addition to the three silver halide emulsion layers having color sensitivities different from each other and corresponding to development of blue, green and red color, respectively, at least one silver halide emulsion layer having color sensitivity different from those of the three silver halide emulsion layers and containing a coupler capable of effecting color correction so that substantially black having a transmission density of 2.5 or more is exhibited when all couplers on the support are reacted;

(10) A method for preparing a color filter having a pixel pattern composed of blue, green and red colors, comprising subjecting the silver halide light-sensitive material as described in any of items (6) to (9) to pattern exposure, color development and desilvering.

BRIEF DESCRIPTION OF THE DRAWINGS

FIG. 1(*b*) is a graph showing a characteristic curve of the light-sensitive material having four light-sensitive layers according to the present invention;

DETAILED DESCRIPTION OF THE INVENTION

Figure 1A:
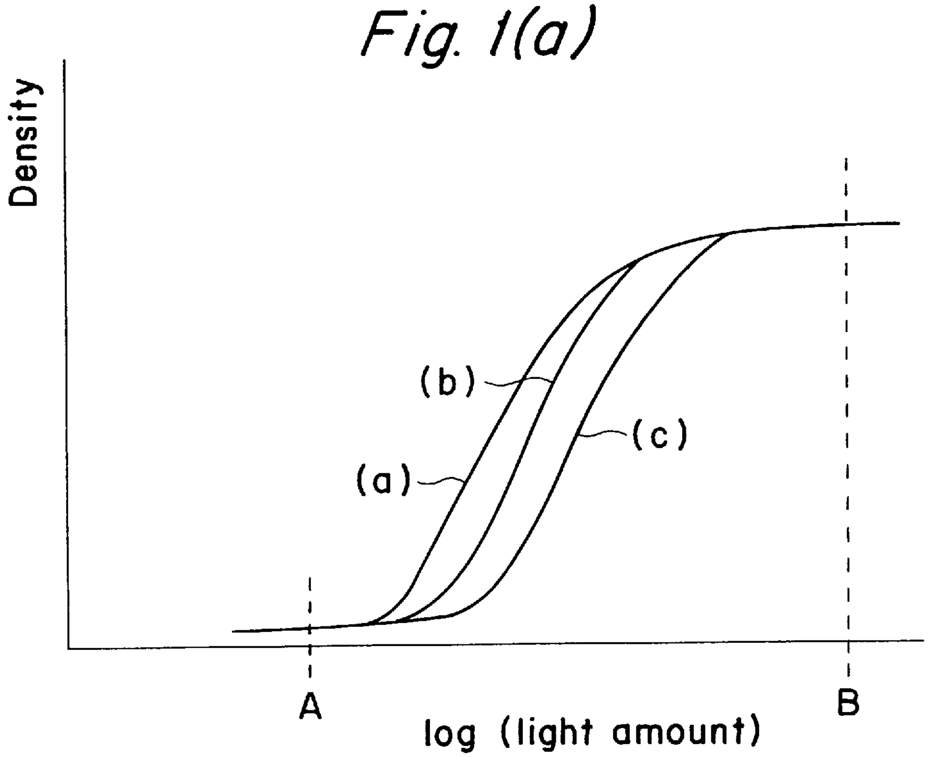
FIG. 1(*a*) is a graph showing a characteristic curve of the light-sensitive material having three light-sensitive layers according to the present invention.

The term "light-insensitive interlayer" as used in the present invention means a light-insensitive layer provided between two silver halide emulsion layers having different color sensitivity from each other. The light-insensitive interlayer does not contain a silver halide emulsion and preferably contains a compound of capable of reacting with an oxidation product of a developing agent such as a reducing agent and uncolored coupler.

The silver halide grain which can be used in the light-sensitive material according to the first embodiment of the present invention includes silver chloride, silver iodochloride, silver chlorobromide and silver iodochlorobromide. Preferably, at least one silver halide emulsion layer has a silver chloride content of 90 mol % or more, more preferably 95 mol % or more. The silver iodide content is preferably 2 mol % or less, more preferably 1 mol % or less, most preferably 0.5 mol % or less.

The silver halide grain which can be used in the light-sensitive material according to the second embodiment of the present invention includes silver chloride, silver iodochloride, silver chlorobromide and silver iodochlorobromide. The silver chloride content is preferably 50 mol % or more, more preferably 80 mol % or more. The silver iodide content is preferably 2 mol % or less, more preferably 1 mol % or less, still most preferably 0.5 mol % or less.

The silver halide emulsion used in the first and second embodiments of the present invention may be either a surface latent image-type emulsion or an internal latent image-type emulsion. The internal latent image-type emulsion is used as a direct reversal emulsion in combination with a nucleating agent or a light fogging agent. The crystal structure may be homogeneous or a multiple structure grain having different halogen compositions between the inside of the grain and the surface of the grain may also be used. Further, silver halide having a different composition may be joined by epitaxial conjunction. Furthermore, a compound other than silver halide, such as silver rhodanate or lead oxide, may be joined.

In the high silver chloride emulsion for use in the present invention, a grain having a silver bromide localized phase as a layer or not as a layer, in the inside and/or the surface of silver halide may also be used. The halogen composition in the above-described localized phase preferably has a silver bromide content of at least 20 mol %, more preferably more than 30 mol %. The silver bromide content in the silver bromide localized phase can be analyzed by an X-ray diffraction method. The application method of the X-ray diffraction method to silver halide grains is described in, for example, C. R. Berry and S. J. Marino, *Photographic Science and Technology*, Vol. 2, p. 149 (1955), and ibid., Vol. 4, p. 22 (1957). The silver bromide localized phase may be placed in the inside of a grain, or at the edge or corner of or on the plane of the grain surface, however, it is preferably joined to the corner part of a grain by epitaxial conjunction.

The silver halide grain may have a regular crystal containing no twin plane, a single twin crystal having one twin plane, a parallel multiple twin crystal having two or more parallel twin planes, a non-parallel multiple twin crystal containing two or more non-parallel twin planes, a spherical form, a potato-like form, a tabular form having a high aspect ratio, or a composite form of these. The shape of a twin crystal grain is described in *Shashin Kogyo no Kiso -Gin'en Shashin Hen* (*Basis of Photographic Industry, Silver Halide Photographic Version*), Nippon Shashin Gakkai (compiler), Corona Sha, p. 163.

In the case of a regular crystal, a cubic grain comprising (100) faces, an octahedral grain comprising (111) faces or a dodecahedral grain comprising (110) faces may be used. The dodecahedral grain is described in JP-B-55-42737 (the term "JP-B" as used herein means an "examined Japanese patent publication") and JP-A-60-222842, and further reported in *Journal of Imaging Science*, Vol. 30, p. 247 (1986). A grain comprising (h11) faces, (hh1) faces, (hk0) faces, or (hk1) faces may also be used depending upon the purpose. Further, a tetradecahedral grain having (111) and (100) faces or a grain having (111) and (110) faces may also be used. If desired, polyhedral grains such as an octatriacontahedral grain, a deflected rhombus tetracosahedral grain, a hexatetracontahedral grain and an octahexacontahedral grain may be used.

A tabular grain having a high aspect ratio may also be preferably used. A high silver chloride emulsion tabular grain comprising (111) faces is described in U.S. Pat. Nos. 4,399,215, 4,400,463 and 5,217,858 and JP-A-2-32. A high silver chloride emulsion tabular grain comprising (100) faces is described in U.S. Pat. Nos. 4,946,772, 5,275,930 and 5,264,337, Japanese Patent Application Nos. 4-214109 and 5-96250, and European Patent 0534395A1. These tabular grains having a high aspect ratio are advantageous in view of color sensitization sensitivity because they have a larger surface area than the regular crystal grain having the same volume and the adsorption amount of sensitizing dyes can be increased. Further, they have a large specific surface area and therefore, exhibit high development activity.

In order to achieve a large specific surface area and a high development activity while reducing the silver amount as much as possible, the average grain size of silver halide grains for use in the present invention is preferably from 0.05 to 0.9 $\mu$m, more preferably from 0.1 to 0.5 $\mu$m. In the case of tabular grains, the thickness is preferably from 0.05 to 0.9 $\mu$m, more preferably from 0.1 to 0.5 $\mu$m. The grain size of silver halide and the thickness of tabular silver halide grain can be measured by an electron photomicrograph obtained by a carbon replica method which shadows grains along with latex particles having a predetermined particle size.

A monodisperse emulsion having a narrow grain size distribution may also be used. The monodisperse emulsion is a silver halide emulsion having a grain size distribution such that 80% or more by number or weight of all grains have a size falling within ±30% of the average grain size. Also, a monodisperse emulsion having a coefficient of variation of 20% or less, preferably 15% or less may be used.

A polydisperse emulsion having a wide grain size distribution may also be used.

The monodisperse emulsions described in U.S. Pat. Nos. 3,574,628 and 3,655,394 and British Patent 1,413,748 are also preferred.

Furthermore, tabular grains having an aspect ratio of about 5 or more may also be used in the present invention. The tabular grains may be simply prepared by the methods described in Gutoff, *Photographic Science and Engineering*, Vol. 14, pp. 248–257 (1970), U.S. Pat. Nos. 4,434,226, 4,414,310, 4,433,048 and 4,439,520, and British Patent 2,112,157.

A mixture of grains having various crystal forms may also be used.

Further, as described in JP-A-1-167743 and JP-A-4-223463, for the purpose of controlling the gradation, two or more kinds of monodisperse silver halide emulsions having substantially the same color sensitivity but different in the grain size may be used in combination. The two or more kinds of emulsions may be mixed in the same layer or may be added to separate layers. A combination of two or more kinds of polydisperse silver halide emulsions or monodisperse emulsions with a polydisperse emulsion may also be used.

During the preparation of a silver halide emulsion of the present invention, a desilvering process is preferably performed to remove salts in excess. The desilvering may be performed by a noodle water washing method where the desilvering is performed while gelling gelatin, or by a flocculation method using an inorganic salt comprising polyvalent anions (e.g., sodium sulfate), an anionic surface active agent, an anionic polymer (e.g., sodium polystyrenesulfonate), or a gelatin derivative (e.g., aliphatic acylated gelatin, aromatic acylated gelatin, aromatic carbamoylated gelatin). Further, ultrafilters described in U.S. Pat. No. 4,758,505, JP-A-62-113137, JP-B-59-43727 and U.S. Pat. No. 4,334,012, a natural flocculation method, and a centrifugal separation method may also be used. The flocculation method is usually preferred.

The preparation method of the silver halide emulsion which can be used in the present invention is described in, for example, *Research Disclosure* (*RD*) "I. *Emulsion Preparation and Types*", Vol. 176, No. 17643 (December, 1978), pp. 22–23, ibid., No. 18716 (November, 1979), p. 648, P. Glafkides, *Chimie et Physique Photographique*, Paul Montel (1967), G. F. Duffin, *Photographic Emulsion Chemistry*, Focal Press (1966), and V. L. Zelikman et al, *Making and Coating Photographic Emulsion*, Focal Press (1964).

The preparation method may be any of an acidic method, a neutral method and an ammonia method. A soluble silver salt may be reacted with a soluble halogen salt by any of a single jet method, a double jet method and a combination thereof. A method of forming grains in the presence of excessive silver ions (so-called reverse double jet method) may also be used. Further, a method of maintaining the pAg in a liquid layer where silver halide is produced constant, as one of the double jet method systems, namely, so-called controlled double jet method, may also be used. According to this method, a silver halide emulsion having a regular crystal form and a nearly uniform grain size can be obtained.

In the preparation of a silver halide emulsion, the pAg and the pH during the grain formation are preferably adjusted. The adjustment of the pAg and the pH is described in *Photographic Science and Engineering*, Vol. 6, pp. 159–165 (1962), *Journal of Photographic Science,* Vol. 12, pp. 242–251 (1964), U.S. Pat. No. 3,655,394 and British Patent 1,413,748.

The protective colloid used in preparation of the emulsion of the present invention is preferably gelatin, however, other hydrophilic binder may be used. The hydrophilic binder may be used alone or in combination with gelatin. Preferred examples of the hydrophilic binder include gelatin derivatives, graft polymers of gelatin and other high polymer, proteins such as albumin and casein, cellulose derivatives such as hydroxyethyl cellulose and cellulose sulfate, sodium alginate, starch derivatives, polysaccharides, carrageenan, synthetic hydrophilic high polymers such as homopolymers or copolymers of polyvinyl alcohol, modified alkyl polyvinyl alcohol, polyvinyl-N-pyrrolidone, polyacrylic acid, polymethacrylic acid, polyacrylamide, polyvinylimidazole or polyvinylpyrazole, and thioether polymers described in U.S. Pat. No. 3,615,624.

The gelatin which can be used includes lime-processed gelatin, acid-processed gelatin, delimed gelatin, gelatin derivatives such as phthalated gelatin, and low molecular gelatin. Also, gelatin subjected to oxidization treatment with an oxidizing agent such as hydrogen peroxide and gelatin treated with an enzyme may be used. Further, hydrolysates and enzymolysates of gelatin may also be used.

Examples of the silver halide solvent include thiocyanates (e.g., those described in U.S. Pat. Nos. 2,222,264, 2,448,534 and 3,320,069), thioether compounds (e.g., those described in U.S. Pat. Nos. 3,271,157, 3,574,628, 3,704,130, 4,297,439 and 4,276,347), thion compounds (e.g., those described in JP-A-53-144319, JP-A-53-82408, JP-A-55-77737), imidazole compounds (e.g., those described in JP-A-54-100717), benzimidazole (e.g., those described in JP-B-60-54662) and amine compounds (e.g., those described in JP-A-54-100717). Ammonia may also be used in combination with a silver halide solvent within the range of causing no adverse effect. The nitrogen-containing compounds as described in JP-B-46-7781, JP-A-60-222842 and JP-A-60-122935 may be added at the stage of formation of silver halide grains. Specific examples of the silver halide solvent are described in detail in JP-A-62-215272, pp. 12–18.

In the process of grain formation or physical ripening of silver halide, a metal salt (including a complex salt) may be present together. Examples of the metal salt include salts or complex salts of noble metals or heavy metals such as cadmium, zinc, lead, thallium, iridium, platinum, palladium, osmium, rhodium, chromium, ruthenium and rhenium. These compounds may be used individually or in combination of two or more thereof. The addition amount is approximately from $10^{-9}$ to $10^{-3}$ mol per mol of silver halide. As the complex ion or coordination compound, bromine ions, chlorine ions, cyan ions, nitrosyl ions, thionitrosyl ions, water, ammonia or a combination thereof may be preferably used. Specific preferred examples thereof include yellow prussiate of potash, $K_2IrCl_6$, $K_3IrCl_6$, $(NH_4)_2RhCl_5(H_2O)$, $K_2RuCl_5(NO)$ and $K_3Cr(CN)_6$. The addition amount varies depending upon the purpose, however, it is approximately from $10^{-9}$ to $10^{-2}$ mol per mol of silver halide. The compound may be introduced into the silver halide grain uniformly inside the grain, locally on the surface or inside of the grain, in the silver bromide localized phase, or in the high silver chloride grain substrate. The compound may be added by mixing the metal salt solution with the aqueous halide solution at the time of grain formation, by adding silver halide emulsion fine grains doped with the metal ions, or by directly adding the metal salt solution during or after the grain formation. In order to increase the sensitivity and the density upon high illumination exposure, a metal complex salt having cyan ions as a ligand, such as iridium and yellow prussiate of potash, lead chloride, cadmium chloride or zinc chloride, is preferably used. In the case of spectral sensitization in the red or infrared region, a metal complex salt having cyan ions as a ligand, such as yellow prussiate of potash, or lead chloride, cadmium chloride or zinc chloride, is preferably used. In the present invention, in order to reduce illumination irregularity upon exposure, the gradation is preferably contrasty as high as possible. To achieve the contrast, an iridium salt, a rhodium salt, a ruthenium salt or a chromium salt is preferably used.

At the time of formation of silver halide grains, the addition rate, the addition amount or the addition concentration of the silver salt solution (e.g., aqueous $AgNO_3$ solution) and the halogen compound solution (e.g., aqueous KBr solution) may be increased to expedite the grain formation speed. This method of rapidly forming silver halide grains is described in British Patent 1,335,925, U.S. Pat. Nos. 3,672,900, 3,650,757 and 4,242,445, JP-A-55-142329, JP-A-55-158124, JP-A58-113927, JP-A-58-113928, JP-A-58-111934 and JP-A-58-111936.

During or after the grain formation, a halogen capable of forming a slightly soluble silver halide grain may be bonded onto the surface of a silver halide grain (halogen conversion). This halogen conversion process is described in *Die Grundlagen der Photograpischen Prozesse mit Silverhalogeniden*, pp. 662–669, and *The Theory of Photographic Process,* 4th ed., pp. 97–98. The halogen may be added as a soluble halide solution or in the state of silver halide fine grains.

The silver halide emulsion of the present invention may be used without subjecting it to chemical sensitization, however, it is usually subjected to chemical sensitization before use. The chemical sensitization of the present invention include chalcogen sensitization such as sulfur sensitization, selenium sensitization and tellurium sensitization, noble metal sensitization using gold, platinum or palladium, and reduction sensitization, and these may be used individually or in combination (as described in, e.g., JP-A-3-110555, JP-A-5-241267). The chemical sensitization may be performed in the presence of a nitrogen-containing heterocyclic compound (as described in, e.g., JP-A-62-253159). Further, an antifoggant which will be described later may be added after completion of the chemical sensitization. More specifically, the methods described in JP-A-5-45833 and JP-A-62-40446 may be used.

As the sulfur sensitizer, a labile sulfur compound is used. Specific examples thereof include known sulfur compounds such as thiosulfates (e.g., hypo), thioureas (e.g., diphenylthiourea, triethylthiourea, allylthiourea), allylisothiocyanate, cystine, p-toluenethiosulfonate, rhodanines and mercapto compounds. The addition amount of the sulfur sensitizer may be sufficient as long as it is large enough to effectively increase the sensitivity of the emulsion and the proper amount varies depending upon various conditions such as the pH, the temperature, the balance with other sensitizers, or the silver halide grain size, however, as a standard, it is preferably from $10^{-9}$ to $10^{-1}$ mol per mol of silver halide.

In the selenium sensitization, a known labile selenium compound is used and specific examples thereof include selenides such as colloidal metal selenium, selenoureas (e.g., N,N-dimethylselenourea, N,N-diethylselenourea), selenoketones, selenoamides, aliphatic isoselenocyanates (e.g., allylisoselenocyanate), selenocarboxylic acids and esters thereof, selenophosphates, diethylselenides, and diethyldiselenides. The addition amount varies depending upon various conditions, the same as in case of the sulfur sensitizer, however, it is, as a standard, preferably from $10^{-10}$ to $10^{-1}$ mol per mol of silver halide.

In the present invention, in addition to the above-described chalcogen sensitization, noble metal sensitization may be performed. In the gold sensitization, various kinds of gold compounds may be used and they may have a gold valency of either +1 or +3. Representative examples thereof include chloroaurates, potassium chloroaurate, auric trichloride, potassium aurithiocyanate, potassium iodoaurate, tetraauric acid, ammonium aurothiocyanate, pyridyl trichlorogold, gold sulfide, gold selenide and gold telluride.

The addition amount of the gold sensitizer varies depending upon various conditions, however, as a standard, it is preferably from $10^{-10}$ to $10^{-1}$ mol per mol of silver halide.

The addition of the gold sensitizer may be performed simultaneously with the sulfur sensitization or with the selenium sensitization and tellurium sensitization, or during, before or after completion of the sulfur sensitization or the selenium or tellurium sensitization. The alone use of the gold sensitizer is also possible.

In the present invention, there is no particular restriction on the pAg or the pH of the emulsion which is subjected to sulfur sensitization, selenium or tellurium sensitization, or gold sensitization, however, preferably, the pAg is from 5 to 11 and the pH is from 3 to 10, more preferably, the pAg is from 6.8 to 9.0 and the pH is from 5.5 to 8.5.

In the present invention, noble metals other than gold can also be used as a chemical sensitizer. As the noble metal other than gold, a salt of platinum, palladium, iridium and rhodium, or a complex salt thereof may also be used as a sensitizer.

In the present invention, further, reduction sensitization may be performed. Examples of known reduction sensitizers which can be used in the present invention include ascorbic acid, stannous salt, amines and polyamines, hydrazine derivatives, formamidinesulfinic acid, silane compounds and borane compounds. These compounds may be used individually or in combination of two or more thereof. Preferred examples of the reduction sensitizer include stannous chloride, thiourea dioxide, dimethylamineborane, L-ascorbic acid and aminoiminomethanesulfinic acid. The addition amount of the reduction sensitizer depends upon the emulsion conditions and it must be selected, however, it is suitably from $10^{-9}$ to $10^{-2}$ mol per mol of silver halide.

In addition to the method of adding the above-described reduction sensitizer, a method called silver ripening where the emulsion are grown or ripened in a low pAg atmosphere at a pAg of from 1 to 7, a method called high pH ripening where the emulsion are grown of ripened in a high pH atmosphere at a pH of 8 to 11, or a method where the reduction sensitization is performed by introducing hydrogen gas or by the hydrogen in the nascent state generated upon electrolysis may also be used. Further, two or more methods may be used in combination.

The reduction sensitization may be used alone or may be used in combination with the above-described chalcogen sensitization or noble metal sensitization.

The light-sensitive silver halide emulsion is usually a silver halide emulsion subjected to chemical sensitization. In the chemical sensitization of the light-sensitive silver halide emulsion of the present invention, chalcogen sensitization such as sulfur sensitization, selenium sensitization and tellurium sensitization, noble metal sensitization using gold, platinum or palladium, and reduction sensitization, which all are known for the emulsion of normal light-sensitive materials, may be used individually or in combination (as described in JP-A-3-110555 and Japanese Patent Application No. 4-75794). The chemical sensitization may be performed in the presence of a nitrogen-containing heterocyclic compound (as described in JP-A-62-253159). Further, an antifoggant which will be described later may be added after completion of the chemical sensitization. More specifically, the methods described in JP-A-5-45833 and JP-A-62-40446 may be used.

In the chemical sensitization, the pH is preferably from 5.3 to 10.5, more preferably from 5.5 to 8.5, and the pAg is preferably from 6.0 to 10.5, more preferably from 6.8 to 9.0.

The total amount of the light-sensitive silver halide emulsion to be coated on the light-sensitive material in the present invention is generally from 1 $mg/m^2$ to 10 $g/m^2$ as calculated in terms of silver.

The light-sensitive silver halide emulsion may be subjected to spectral sensitization with a methine dye or a nucleus thereof so that the silver halide can have color sensitivity to green, red or infrared. Further, the blue-sensitive emulsion may be subjected to spectral sensitization in the blue region, if desired.

The dye which can be used includes cyanine dyes, merocyanine dyes, complex cyanine dyes, complex merocyanine dyes, holopolar cyanine dyes, hemicyanine dyes, styryl dyes and hemioxonol dyes. Particularly useful are dyes belonging to the cyanine dye, the merocyanine dye and the complex merocyanine dye. To these dyes, any nucleus which is usually used in cyanine dyes as a basic heterocyclic nucleus may be applied. Examples of the nucleus include a pyrroline nucleus, an oxazoline nucleus, a thiazoline nucleus, a pyrrole nucleus, an oxazole nucleus, a thiazole nucleus, selenazole nucleus, imidazole nucleus, a tetrazole nucleus and pyridine nucleus; a nucleus resulting from fusion of an alicyclic hydrocarbon ring to these nuclei; a benzindolenine nucleus, an indole nucleus, a benzoxazole nucleus, a naphthoxazole nucleus, benzothiazole nucleus, a naphthothiazole nucleus, a benzoselenazole nucleus, a benzimidazole nucleus and a quinoline nucleus. Each of these nuclei may have a substituent on the carbon atom thereof.

To the merocyanine dye or complex merocyanine dye, a 5- or 6-membered heterocyclic nucleus as a nucleus having a ketomethylene structure, such as a pyrzolin-5-one nucleus, a thiohydantoin nucleus, a 2-thioxazolidin-2,4-dione nucleus, a thiazolidin-2,4-dione nucleus, a rhodanine nucleus and a thiobarbituric acid nucleus, may be applied.

Specific examples thereof include sensitizing dyes described in U.S. Pat. No. 4,617,257, JP-A-59-180550, JP-A-64-13546, JP-A-5-45828 and JP-A-5-45834.

These sensitizing dyes may be used individually or in combination, and the combination of sensitizing dyes are often used for the purpose of supersensitization or control of wavelength in spectral sensitization.

Together with the sensitizing dye, a dye which itself has no spectral sensitization effect, or a compound which absorbs substantially no visible light, but exhibits supersensitization may be incorporated into the emulsion (e.g., those described in U.S. Pat. No. 3,615,641, JP-A-59-192242, JP-A-59-191032, JP-A-63-23145). In particular, those described in JP-A-59-191032 and JP-A-59-192242 are preferably used in the case of using a sensitizing dye having spectral sensitization sensitivity in the region of from red to infrared.

The dye may be added to the emulsion at any stage during preparation of the emulsion. Most commonly, the dye is added between after completion of the chemical sensitization and before coating, however, as described in U.S. Pat. Nos. 3,628,969 and 4,225,666, the dye may be added simultaneously with the chemical sensitizer to perform spectral sanitization at the same time with chemical sensitization, or as described in JP-A-58-113928, the dye may be added before chemical sensitization. Further, the dye may be added before completion of the precipitation of silver halide grains to start spectral sensitization. Furthermore, as described in U.S. Pat. No. 4,225,666, the compound may be added by installments, namely, a part of the compound may be added prior to chemical sensitization and the rest may be added after chemical sensitization, and including the method described in U.S. Pat. No. 4,183,756, the addition may be made at any stage during formation of silver halide grains.

The addition amount is from $9\times10^{-9}$ to $9\times10^{-3}$ per mol of silver halide.

The sensitizing dye or the supersensitizer may be added as a solution of a hydrophilic organic solvent such as methanol, an aqueous solution (alkaline or acidic so as to increase solubility), a gelatin dispersion or a surface active agent solution.

In order to increase adsorption of the sensitizing dye, a soluble Ca compound, a soluble Br compound, a soluble I compound, a soluble Cl compound or a soluble SCN compound may be added before, during or after addition of the sensitizing dye. These compounds may be used in combination. Preferred are $CaCl_2$, KI, KCl, KBr and KSCN. Also, the compound may be in the state of fine particle emulsion grains of silver bromide, silver chlorobromide, silver iodobromide, silver iodide or silver rhodanate.

In the present invention, the total coated amount of silver halide is from $10^{-3}$ to $5\times10^{-2}$ mol per $m^2$ of the light-sensitive material, the equivalent ratio of silver halide to the couplers contained in each silver halide emulsion layer is preferably 1 to 2, and the amount of silver halide is preferably from $10^{-3}$ to $10^{-2}$ per g of the binder contained in each silver halide emulsion layer.

With respect to other additives which can be incorporated into the light-sensitive material of the present invention, there is no particular limitation, and *Research Disclosure*, Vol. 176, Item 17643 (RD-17643), ibid., Vol. 187, Item 18716 (RD-18716), and ibid., Vol. 307, Item 307105 can be referred to.

The pertinent parts of RD-17643, RD-18716 and RD-307105 describing additives for use in the above-described process and known photographic additives which can be used in the present invention are summarized below.

| Kinds of Additives | RD17643 | RD18716 | RD307105 |
|---|---|---|---|
| 1. Chemical sensitizer | p. 23 | p. 648, right col. | p. 866 |
| 2. Sensitivity increasing agent | | " | |
| 3. Spectral sensitizer, supersensitizer | pp. 23–24 | p. 648, right col.–p. 649, right col. | pp. 866–868 |
| 4. Brightening agent | p. 24 | p. 648, right col. – | p. 868 |
| 5. Antifoggant, stabilizer | pp. 24–25 | p. 649, right col. – | pp. 868–870 |
| 6. Light absorbent, filter dye, UV absorbent | pp. 25–26 | p. 649, right col.–p. 650, left col. | p. 873 |
| 7. Stain inhibitor | p. 25, right col. | p. 650, left to right cols. | |
| 8. Dye Image Stabilizer | p. 25 | p. 650, left col. | p. 872 |
| 9. Hardening agent | p. 26 | p. 651, left col. | pp. 874–875 |
| 10. Binder | p. 26 | " | pp. 873–874 |
| 11. Plasticizer, lubricant | p. 27 | p. 650, right col. | p. 876 |
| 12. Coating aid, surface active agent | pp. 26–27 | " | pp. 875–876 |
| 13. Antistatic agent | p. 27 | " | pp. 876–877 |
| 14. Matting agent | | | pp. 878–879 |

Among the above-described additives, preferred as the antifoggant or the stabilizer are azoles (e.g., benzothiazolium salts, nitroimidazoles, nitrobenzimidazoles, chlorobenzimidazoles, bromobenzimidazoles, nitroindazoles, benzotriazoles, aminotriazoles); mercapto compounds {e.g., mercaptothiazoles, mercaptobenzothiazoles, mercaptobenzimidazoles, mercaptothiadiazoles, mercaptotetrazoles (in particular, 1-phenyl-5-mercaptotetrazole and derivatives thereof), mercaptopyrimidines, mercaptotriazines}; thioketo compounds such as oxazolinethione; azaindenes {e.g., triazaindenes, tetrazaindenes (in particular, 4-hydroxy-6-methyl(1,3,3a,7)tetrazaindene), pentazaindenes}; benzenethiosulfones; benzenesulfinic acid; and benzenesulfonic acid amide.

The color developing agent which can be used in the present invention may be sufficient as long as the oxidation product of the developing agent produced upon development of silver halide make a coupling reaction with a coupler and thereby a dye is formed, and those known in the photographic art may be used. Specific examples of the color developing agent are described in T. H. James, *The Theory of the Photographic Process,* 4th ed., pp. 291–334 and pp. 353–361. The particularly preferred color developing agent is a p-phenylenediamine derivative.

In the present invention, various color couplers may be used and specific examples thereof are described in patents cited in *Research Disclosure* (*RD*), No. 17643, VII-C to G.

As the coupler for use in the present invention, a two-equivalent coupler substituted by a splitting-off group is more preferable than the four-equivalent color coupler having a hydrogen atom at the active site because the coated silver amount can be reduced.

A representative example of the yellow coupler which can be used in the present invention is an oil protect-type acylacetamide-base coupler. Specific examples thereof are described in U.S. Pat. Nos. 2,407,210, 2,875,057 and 3,265,506. In the present invention, a two-equivalent yellow coupler is preferably used and representative examples thereof include oxygen atom-releasing yellow couplers described in U.S. Pat. Nos. 3,408,194, 3,447,928, 3,935,501 and 4,022,620, and nitrogen atom-releasing yellow couplers described in JP-B-58-10739, U.S. Pat. Nos. 4,401,752, 4,326,024, *RD,* 18053 (April, 1979), British Patent 1,425,020, West German Patent Application (OLS) Nos. 2,219,917, 2,261,361, 2,329,587 and 2,433,812. The α-pivaloylacetanilide-type coupler is excellent in the fastness, particularly light fastness, of the colored dye, whereas the α-benzoylacetanilide-type coupler can provide a high color density.

The magenta coupler which can be used in the present invention includes oil protect-type, preferably, 5-pyrazolone-base couplers and pyrazoloazole-base couplers such as pyrazolotriazoles. The 5-pyrazolone-base coupler is preferably substituted by an arylamino group or an acylamino group at the 3-position in view of hue and color density of the colored dye. Representative examples thereof are described in U.S. Pat. Nos. 2,311,082, 2,343,703, 2,600,788, 2,908,573, 3,062,653, 3,152,896 and 3,936,015. The splitting-off group of the two-equivalent 5-pyrazolone-base coupler is particularly preferably the nitrogen atom splitting-off group described in U.S. Pat. No. 4,310,619 or the arylthio group described in U.S. Pat. No. 4,351,897. The 5-pyrazolone-base coupler having a ballast group described in European Patent 73,636 can provide a high color density.

The pyrazoloazole-base coupler includes pyrazolobenzimidazoles described in U.S. Pat. No. 3,369,879, preferably pyrazolo[5,1-c][1,2,4]triazoles described in U.S. Pat. No. 3,725,067, pyrazolotetrazoles described in *Research Disclosure*, No. 24220 (June, 1984), and pyrazolopyrazoles described in *Research Disclosure,* No. 24230 (June, 1984). In view of less yellow side absorption and light fastness of the colored dye, imidazo[1,2-b]pyrazoles described in European Patent 119,741 are preferred, and pyrazolo[1,5-b][1,2,4]triazole described in European Patent 119,860 is particularly preferred.

The cyan coupler which can be used in the present invention includes naphthol-base couplers described in U.S. Pat. Nos. 2,474,293, 4,052,212, 4,146,396, 4,228,233 and 4,296,200, phenol-base cyan couplers having an alkyl group of ethyl or greater group at the meta-position of the phenol nucleus described in U.S. Pat. No. 3,772,002, 2,5-diacylamino-substituted phenolic couplers described in U.S. Pat. Nos. 2,772,162, 3,758,308, 4,126,396, 4,334,011 and 4,327,173, West German Patent Application (OLS) No. 3,329,729 and JP-B-3-18175, and phenolic couplers having a phenylureido group at the 2-position and an acylamino group at the 5-position described in U.S. Pat. Nos. 3,446,622, 4,333,999, 4,451,559 and 4,427,767. In particular, as the coupler having excellent heat resistance and light resistance, carbostyryl couplers described in Japanese Patent Application No. 6-84315 are preferably used in the present invention.

Other than the above-described couplers, various couplers described below can be used in the present invention.

Typical examples of the polymerized dye forming coupler are described in U.S. Pat. Nos. 3,451,820, 4,080,211 and 4,367,282, and British Patent 2,102,173.

The coupler which releases a photographically useful residue upon coupling is also preferably used in the present invention. The DIR coupler which releases a development inhibitor is described in patents cited in *RD*, No. 17643, Item VII-F, JP-A-57-151944, JP-A-57-154234, JP-A-60-184248 and U.S. Pat. No. 4,248,962.

As the coupler which imagewise releases a nucleating agent or a development accelerator upon development, those described in British Patents 2,097,140 and 2,131,188, JP-A-59-157638 and JP-A-69-170840 are preferred.

In addition, the coupler which can be used in the light-sensitive material of the present invention includes competitive couplers described in U.S. Pat. No. 4,130,427, poly-equivalent couplers described in U.S. Pat. Nos. 4,283,472, 4,338,393 and 4,310,618, DIR redox compound-releasing couplers described in JP-A-60-185950, and couplers which release a dye capable of recovering the color after being released described in European Patent 173,302A.

The coupler for color correction to black is not limited to those of coloring to yellow, magenta or cyan color, but those of coloring, for example, to brown, orange, violet or black may be used.

In the first embodiment of the present invention, the equivalent ratio of silver halide to coupler in each silver halide emulsion layer is preferably from 1 to 2. The term "equivalent ratio" is used herein such that when the silver halide is used in a theoretical amount necessary for coloring all couplers, the equivalent ratio is 1, and when the silver halide is coated in an amount of 2 times the theoretical amount, the equivalent ratio is 2. More specifically, in the case of using a two-equivalent coupler, when the coated silver amount is 2 mols per mol of the coupler, the equivalent ratio is 1 and when the coated silver amount is 4 mols, the equivalent ratio is 2.

In the second embodiment of the present invention, the equivalent ratio of silver halide to coupler in each silver halide emulsion layer is preferably from 1 to 3. When a silver halide emulsion having an average grain size (in the case of a tabular grin, determined by the thickness) of 0.9 $\mu$m or less, especially 0.5 $\mu$m or less is used, the equivalent ratio is preferably from 1 to 2.

The coupler for use in the first and second embodiments of the present invention may be incorporated into the light-sensitive material by various known dispersion methods.

Examples of the high boiling point solvent for use in the oil-in-water dispersion method are described in U.S. Pat. No. 2,322,027. The amount of the high boiling point solvent is generally 10 g or less, preferably 5 g or less, more preferably from 0.1 to 1 g per g of the coupler, and generally 2 g or less, preferably 1 g or less, more preferably 0.5 g or less per g of the binder. The size of the coupler dispersion (coupler emulsified product) obtained by the oil-in-water dispersion method is generally from 0.05 to 0.9 $\mu$m, preferably from 0.1 to 0.5 $\mu$m.

The process and effect of the latex dispersion method and specific examples of the latex for impregnation are described in U.S. Pat. No. 4,199,363, West German Patent Application (OLS) Nos. 2,541,274 and 2,541,230.

In the light-sensitive material of the present invention, the coupler-containing layer preferably uses a dye image preservability improving compound described in European Unexamined Patent Publication EP0,277,589A2. In particular, it is preferably used in combination with a pyrazoloazole-base magenta coupler.

More specifically, Compound (F) which reacts with the aromatic amine developing agent remaining after color development to produce a chemically inactive and substantially colorless compound and/or Compound (G) which reacts with the oxidation product of the aromatic amine developing agent remaining after color development to produce a chemically inactive and substantially colorless compound are preferably used simultaneously or individually for preventing generation of stains or other side reaction due to a colored dye produced by the reaction of a coupler and a color developing agent or an oxidation product thereof remaining in the layer during storage after the processing.

The silver halide emulsion layer or the interlayer of the light-sensitive material of the present invention may contain a hydroquinone derivative, an aminophenol derivative, a gallic acid derivative or an ascorbic acid derivative as an antifoggant or a color mixing inhibitor. Among these, preferred are those which hardly generate stains even upon heating at from 160° to 200° C.

In order to prevent deterioration of the cyan dye image due to heat and, in particular, light, it is more effective to incorporate an ultraviolet absorbent into the cyan coloring layer and both layers adjacent thereto.

Examples of the ultraviolet absorbent include benzotriazole compounds substituted with an aryl group (e.g., those described in U.S. Pat. No. 3,533,794), 4-thiazolidone compounds (e.g., those described in U.S. Pat. Nos. 3,314,794 and 3,352,681), benzophenone compounds (e.g., those described in JP-A-46-2784), cinnamic ester compounds (e.g., those described in U.S. Pat. Nos. 3,705,805 and 3,707,395), butadiene compounds (e.g., those described in U.S. Pat. No. 4,045,229) and benzoxazole compounds (e.g., those described in U.S. Pat. Nos. 3,406,070 and 4,271,307). An ultraviolet light absorbing coupler (e.g., an α-naphthol-base cyan dye forming coupler) or an ultraviolet absorbing polymer may also be used. The ultraviolet absorbent may be mordanted to a specific layer. Among those described above, a benzotriazole compound substituted by an aryl group is preferred.

To the light-sensitive material of the present invention, an antiseptic or an antimold as described in JP-A-63-271247 is preferably added to prevent various molds and bacteria which proliferate in the hydrophilic colloid layer and deteriorate the image.

Gelatin is advantageous as the binder or the protective colloid which can be used in the silver halide emulsion layer, the interlayer or the protective layer of the light-sensitive material of the present invention, however, other hydrophilic polymers may be used. Examples of the hydrophilic polymer include polyvinyl alcohol, polyvinyl alcohol partial acetal, polyvinyl butyral, poly-N-vinylpyrrolidone, polyacrylic acid, polyacrylamide, polyvinylimidazole, polyvinylpyrazole, carrageenan, gum arabic, and a homopolymer or a copolymer of cellulose derivatives such as hydroxyalkyl cellulose, carboxymethyl cellulose, cellulose sulfate, cellulose acetate hydrogen phthalate or sodium alginate.

Also, graft polymer of gelatin with other high polymer may also be used and examples of the gelatin graft polymer include those obtained by grafting a homopolymer or a copolymer of an acrylic acid, a methacrylic acid, a derivative of the acrylic acid or the methacrylic acid such as ester or amide, or vinyl monomers such as acrylonitrile or styrene, to gelatin. In particular, graft polymers with a polymer having somewhat compatibility with gelatin, such as a polymer of acrylic acid, methacrylic acid, acrylamide, methacrylamide or hydroxyalkylmethacrylate, are preferred. Examples thereof are described in U.S. Pat. Nos. 2,763,625, 2,831,767 and 2,956,884, and JP-A-56-65133.

Representative examples of the synthetic hydrophilic high polymer material which can be used in the present invention are described in West German Patent Application (OLS) No. 5,312,708, U.S. Pat. Nos. 3,620,751 and 3,879,205, and JP-B-43-7561.

The above-described hydrophilic polymers may be used either individually or in combination of two or more thereof.

The gelatin may be an alkali-treated gelatin, an acid-treated gelatin, an enzyme-treated gelatin or a mixture thereof. Further, gelatin derivatives obtained by reacting various compounds such as an acid halide, an acid anhydride, an isocyanate, a bromoacetic acid, an alkanesultone acid, a vinylsulfonamide, a maleinimido compound, a polyalkylene-oxide, an epoxy compound, with gelatin may also be used. Specific examples of the gelatin derivative are described in U.S. Pat. Nos. 2,614,928, 3,132,945, 3,186,846 and 3,312,553, British Patent 861,414, 1,033,189 and 1,005,784, and JP-B-42-26845.

The total binder amount in the light-sensitive material of the first embodiment of the present invention is preferably from 3 to 10 $g/m^2$ and the binder content in each silver halide emulsion layer or interlayer is preferably from 0.1 to 3 $g/m^2$, more preferably from 0.2 to 2.5 $g/m^2$, per one layer.

In the second embodiment of the present invention, the proportion of organic compounds other than polymers to all organic compounds in each silver halide emulsion layer is 55% by weight or less and the binder amount in each silver halide emulsion layer is preferably from 0.3 to 3 $g/m^2$. The polymer as used herein includes all polymers in addition to the above-described binder irrespective of being hydrophilic or hydrophobic (oleophilic). The polymer softens upon heating at from 150° to 250° C., but hardly diffuses. On the other hand, apart from the water-soluble dye which dissolves out into the processing solution upon development, many of organic compounds other than the polymer, in particular, oil-soluble organic compounds melt at the above-described temperatures and readily diffuse. The cyan, magenta and yellow dyes formed by the internal development method themselves also melt or co-melt with other low molecular components present together and diffuse, and thereby blurring of picture elements on the color filter is readily caused. As a result of extensive investigations, the present inventors have found that when the proportion of low molecular weight organic compounds including couplers to all organic compounds in a silver halide emulsion layer exceeds 55% by weight, the dye formed in the silver halide emulsion layer diffuses to an extreme extent and the blurring of picture elements increases. The lower limit is about 5% by weight.

Further, if the proportion of organic compounds other than polymers to all organic compounds in the light-insensitive interlayer exceeds 55% by weight, the dye produced readily diffuses at the interface between the silver halide emulsion layer and the interlayer and also, blurring of picture elements is caused.

In the second embodiment of the present invention, the total binder amount in the light-sensitive material is, for reducing the layer thickness of the color filter as much as possible, preferably from 3 to 10 $g/m^2$, more preferably from 3.5 to 7 $g/m^2$. The binder amount in each silver halide emulsion layer is preferably from 0.3 to 1.5 $g/m^2$, more preferably from 0.35 to 1.0 $g/m^2$. The binder amount in each interlayer or protective layer is preferably from 0.1 to 1.5 $g/m^2$, more preferably from 0.2 to 1.0 $g/m^2$.

In the case where a peeling-off layer or a back layer is provided in the light-sensitive material, the binder in these layers has no direct relation to the constituent components of the color filter. Accordingly, the amount of the binder in these layers is not counted in "total binder amount" described in the first and second embodiments of the present invention.

The support for use in the present invention is preferably a light-transmitting substrate, however, as described in Japanese Patent Application No. 6-1363, silver halide emulsion layers provided on a separate support may be transferred and firmly bonded onto a light-transmitting substrate to prepare a light-sensitive material for the color filter. In this case, the support is not necessarily required to be transparent and for example, a support having carbon black coated on the back surface thereof may be used.

The material constituting the light-transmitting substrate preferably has an optically isotropic property and excellent heat resistance and examples thereof include polyethylene terephthalate, polybutylene terephthalate, polyethylene naphthalate polystyrene, polycarbonate, polyether sulfone, cellulose acetate, polyarylate, soda glass, borosilicate glass and quartz.

The surface of the substrate constituted by the above-described material may be subjected to undercoating treatment, if desired. Further, the surface may be subjected to glow discharge, corona discharge or ultraviolet (UV) irradiation treatment.

The light-transmitting substrate may be used in the form of a plate, a sheet or a film. The thickness of the substrate may be appropriately selected depending upon the use and the construction material, however, it is commonly from 0.01 to 10 mm. For example, in the case of a glass substrate, the thickness is from 0.3 to 3 mm.

The silver halide light-sensitive material of the present invention is a usual negative or positive color photographic light-sensitive material having such a structure that the blue-sensitive emulsion layer contains a yellow coupler, the green-sensitive emulsion layer contains a magenta coupler and the red sensitive emulsion layer contains a cyan coupler, and in addition having the following constitution (I) or (II).

Figure 1B:
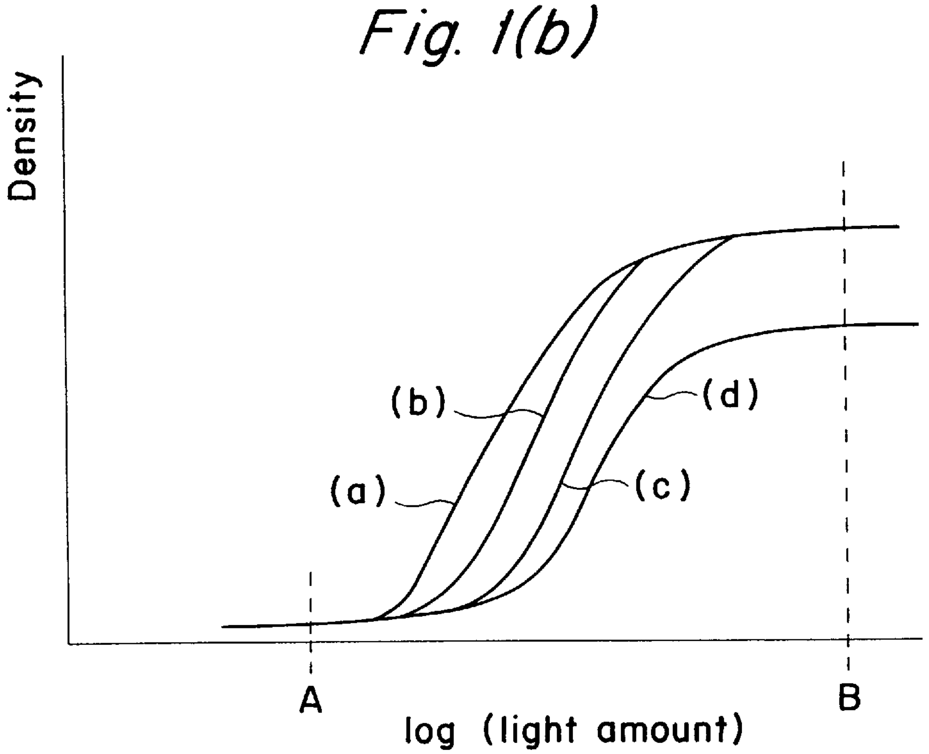
Figure 2:
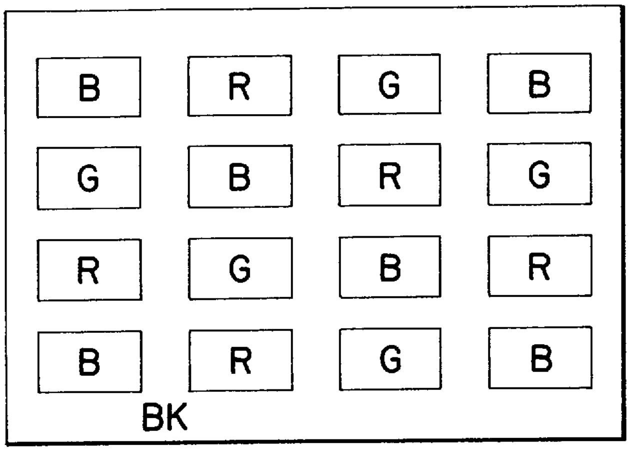
FIG. 2 is a schematic view showing one embodiment of the RGB color filter of the present invention.

(I) As one example of the silver halide light-sensitive material of the present invention, the material having a characteristic curve shown in FIG. 1(*a*) is used. In FIGS. 1(*a*) and 1(*b*), a, b and c indicate characteristic curves of a red-sensitive emulsion, a green-sensitive emulsion and blue-sensitive emulsion, respectively. The blue-sensitive emulsion layer contains a cyan coupler and a magenta coupler (or a blue coupler), the green-sensitive emulsion layer contains a yellow coupler and a cyan coupler (in this case, couplers are preferably selected to provide a combination of dyes as described in Japanese Patent Application No. 6-274649), and the red-sensitive emulsion layer contains a yellow coupler and a magenta coupler (or a red coupler). Four kinds of mask filters (having light transmitting parts (T) corresponding to the red area, the green area, the blue area or the black area of the color filter and shielding parts (S)) as shown in FIG. 3 (each having a pattern capable of giving exposure at the position of Point A and Point B in FIG. 1(*a*)) and color filters being in conformity to each spectral sensitivity of the light-sensitive material are used in combination to expose the light-sensitive material to red, green, blue and white light. Namely, each mask filter is superposed on the corresponding color filter to expose the light-sensitive material to each light. Thereafter, the light-sensitive material was subjected to color development, desilvering and water washing and as a result, a color filter colored to red (R), green (G), blue (B) and black (BK) as shown in FIG. 2 is obtained.

(II) As one example of the silver halide light-sensitive material, in the light-sensitive material described in (I) above, an infrared-sensitive emulsion layer is further provided to prepare a light-sensitive material having a characteristic curve shown in FIG. 1(*b*) wherein a, b, c are the same as in FIG. 1(*a*) and d indicates a characteristic curve of an infrared-sensitive emulsion. This emulsion layer contains a coupler capable of color correction to give substantially black color (END≧2.5) having a transmission density of 2.5 or more upon reaction of all couplers on the support. The transmission density can be measured by using a X-Rite densitometer under Status A condition. The infrared-sensitive emulsion layer as the fourth silver halide emulsion layer may be constituted by two or more unit layers. In this case, by appropriately selecting the layer structure of and couplers contained in each unit layer, an interlayer between one silver halide emulsion layer and other silver halide emulsion layer nearest thereto may be eliminated. The coupler for color correction may be the same with or different from the coupler used in the red, green or blue-sensitive emulsion layer. In the same manner as in (I) above, using four kinds of mask filters shown in FIG. 3 and color filters in conformity to the spectral sensitivity of each silver halide emulsion layer of the light-sensitive material, the light-sensitive material is exposed to red, green, blue and white light (including infrared light required), and then subjected to color development, desilvering and water washing. As a result, a color filter colored to red, green, blue and high-density black as shown in FIG. 2 is obtained.

In the constitution (I) or (II), the color sensitivity is not limited to a combination of blue sensitivity, green sensitivity, red sensitivity and infrared sensitivity, but a combination with ultraviolet sensitivity or yellow sensitivity may also be used or a plurality of infrared sensitivities different in the sensitive wavelength region may be used. Also, the order for providing silver halide emulsion layers having color sensitivities different from each other is not limited to the above-described arrangement, but any order may be freely selected. Further, in addition to the above-described layer structure, a subbing layer, an interlayer, a yellow filter layer capable of bleaching, a protective layer or an ultraviolet absorbing layer may also be provided.

In the present invention, the constitution (I) or (II) is preferably used in view of color reproduction.

The light-sensitive material of the present invention is subjected to color development by usual methods described in *RD*, No. 17643, pp. 28–29 and ibid., No. 18716, p. 651, left to right columns, to obtain a micro color filter.

For example, the light-sensitive material is subjected to color development, desilvering and water washing. In the desilvering process, bleach-fixing processing using a bleach-fixing solution may be performed in place of bleaching using a bleaching solution and fixing using a fixing solution, or bleaching, fixing and bleach-fixing may be used in combination in any order. Stabilization may be performed in place of water washing or stabilization may be performed after water washing. Further, mono-bath processing using a mono-bath developing-bleaching-fixing solution capable of conducting color development, bleaching and fixing in one bath may also be performed. In combination with these processing steps, pre-hardening processing, neutralization processing therefor, stopping-fixing processing, after-hardening processing, regulating processing or intensification processing may be performed. In these processings, activator processing may be performed in place of color development processing.

Furthermore, as described in Japanese Patent Application No. 5-302804, in the case of an internal latent image-type autopositive emulsion, color development and desilvering may be performed using a combination of a nucleating agent and a light fogging agent.

With respect to the developing apparatus, in the case of a flexible support (substrate), a developing machine used in usual photographic processing may be used. In the case of a hard support such as glass, a developing machine for glass dry plate or a developing apparatus described in JP-A-7-56015 may be used.

The exposure method which can be used in the present invention includes a face exposure method through a mask and a scanning exposure method. The scanning method includes a line (slit) scanning method and a point scanning method using laser exposure.

The light source includes a tungsten lamp, a halogen lamp, a fluorescent lamp (e.g., three wavelength-type fluorescent lamp), a mercury lamp, a laser light and a light emitting diode. Among these, a halogen lamp, a fluorescent lamp and a laser light are preferred.

Another example of the exposure method which can be used in the present invention is a method where, as described in Japanese Patent Application No. 7-24563, a liquid display panel into which the color filter prepared according to the present invention is integrated is used and exposed together with color filters three times in sequence.

In the color filter produced according to the present invention, a protective layer (overcoat layer) of a resin having heat resistance, water resistance and high electric resistivity may be provided as the outermost layer. Examples of the resin are described in U.S. Pat. Nos. 4,698,295 and 4,668,601, European Patent Applications EP-179636A and 556810A, JP-A-3-163416, JP-A-3-188153, JP-A-5-78443, JP-A-1-276101, JP-A-60-216307 and JP-A-63-218771.

On the color filter produced according to the method of the present invention, a transparent electrode (e.g., ITO) may be provided by evaporation coating, for example, vacuum evaporation or sputtering.

Further thereon, an orientation layer composed of polyimide resin may be provided.

Furthermore, a polarizing plate or a phase difference film may be provided on the surface opposite to the emulsion surface side of the light-transmitting substrate of the color filter.

The color liquid crystal display (LCD) using the color filter of the present invention is described.

Figure 4:
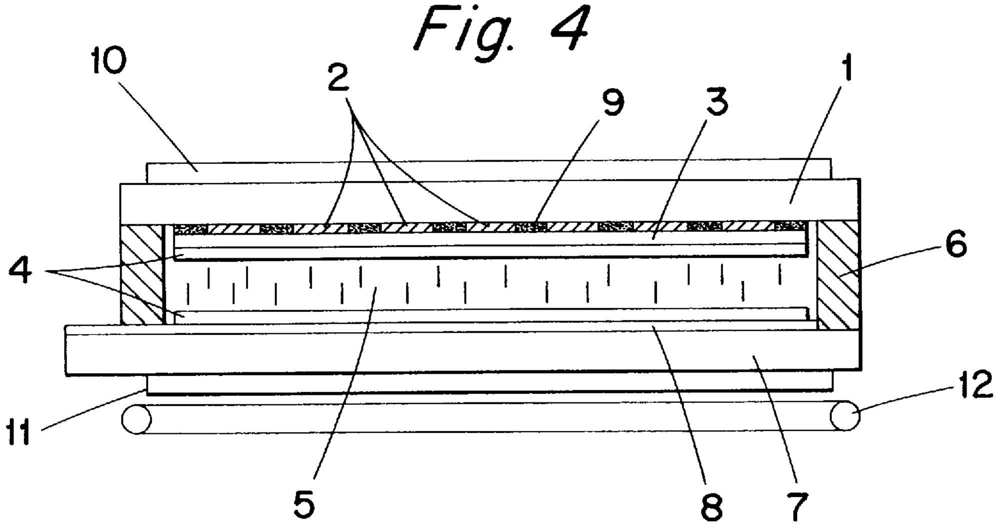
FIG. 4 is one example of a cross-sectional schematic view of a color liquid crystal display (LCD) using the color filter of the present invention.
Figure 3A:
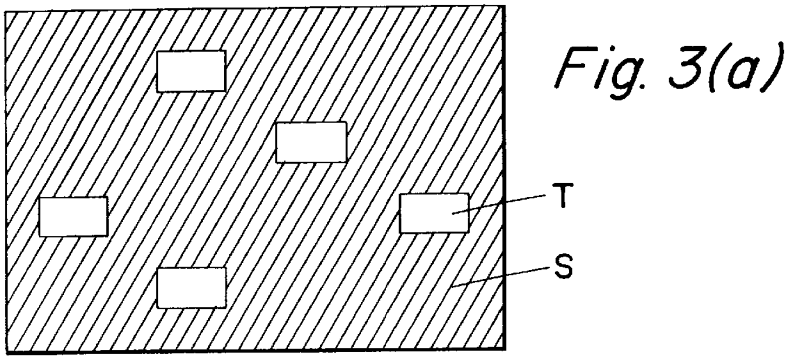
FIG. 3 is a schematic view showing one embodiment of a mask filter for use in exposure of the light-sensitive material of the present invention.
Figure 3B:
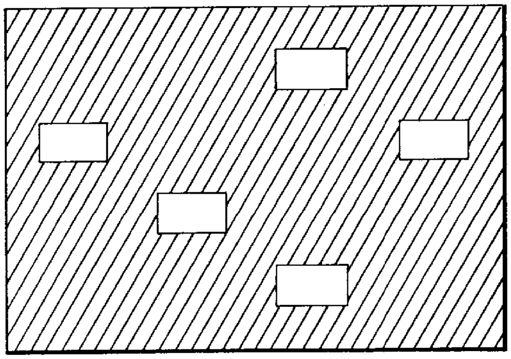
Figure 3C:
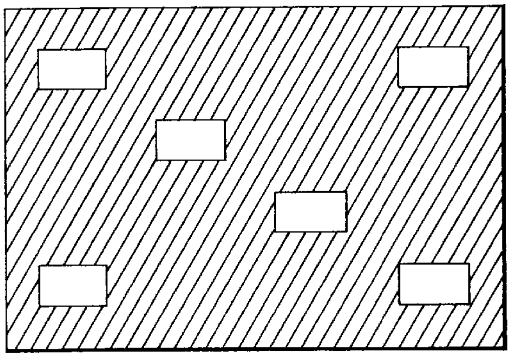
Figure 3D:
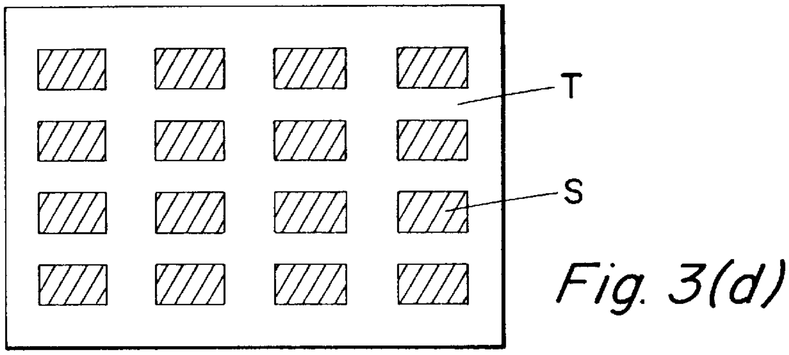

FIG. 4 shows an example of the cross-sectional schematic view of a liquid crystal display. The surface of the color filter 2 prepared according to the present invention and provided on the glass plate 1 is covered by the above-described resin, forming a protective layer (not shown). On the protective layer, a transparent electrode (e.g., ITO electrode) 3 is bonded using a vacuum film-forming apparatus. The transparent electrode 3 is formed, in the case of an active matrix driving LCD using a three terminal switching array such as TFT, as an entire surface integrated electrode, and in the case of a simple matrix driving LCD or an active matrix driving LCD using a two terminal switching array such as MIM, it is usually formed as a stripe electrode. On the transparent electrode 3, an orientation layer 4 made of polyimide is disposed to regulate the liquid crystal molecules.

On the other hand, also on the glass plate 7 on the opposite side over the liquid crystal layer 5, a spacer (not shown) and a sealing member 6, a transparent electrode (e.g., ITO electrode) 8 and thereon an orientation layer 4 are provided. The transparent electrode 8 is, in the case of an active matrix driving LCD using a three terminal switching array such as TFT, a picture element electrode connected by TFT elements, and in the case of a simple matrix driving LCD such as STN, it is usually a stripe electrode. The electrode 8 is disposed transversely to the transparent electrode 3.

In the interspace of respective picture elements of R, G and B, black matrix 9 is usually formed to improve the contrast or the color purity. The black matrix 9 may be formed simultaneously with respective picture elements of R, G and B as in the present invention or a Cr film or a carbon film may be separately formed. On the back surface of each of the glass plates 1 and 2, a polarizing plate 10 or 11 is provided. A phase difference compensation film (not shown) may also be provided between each glass plate and the polarizing plate thereon.

The LCD using a color filter has a small light transmission and accordingly, a back light 12 in good consistence with the color filter in terms of color reproduction is usually installed as a light source.

In place of the glass plate, a plastic film substrate having provided thereon a gas barrier layer or a hard coat layer may be used as the light-transmitting substrate.

The color LCD and the production method thereof are described in detail in Shoichi Matsumoto and Ichiryo Tsunoda, *Ekisho no Kiso to Oyo* (*Basis and Application of Liquid Crystal*), issued by Kogyo Chosa Kai (1991), *Flat Panel Display*, 1994, complied by Nikkei Microdevice, issued by Nikkei BP Sha (1993) and JP-A-1-114820.

The present invention will be described below in greater detail by referring to the examples but it should not be construed as being limited to these examples.

EXAMPLE 1

The preparation of Light-Sensitive Silver Halide Emulsion (I) is described below.

To a well stirred aqueous gelatin solution having a composition shown in Table 1, Solution (I) shown in Table 2 was added over 1 minute. Twenty seconds after initiation of the addition of Solution (I), Solution (II) was added over 40 seconds, and 2 minutes after then, Solutions (III) and (IV) were added simultaneously over 4 minutes.

TABLE 1

| Composition of Aqueous Gelatin Solution | |
|---|---|
| $H_2O$ | 650 ml |
| Lime-processed gelatin | 20 g |
| NaCl | 3 g |
| Silver Halide Solvent (1) | 0.015 g |
| Temperature | 40° C. |

TABLE 2

| | Solution (I) | Solution (II) | Solution (III) | Solution (IV) |
|---|---|---|---|---|
| $AgNO_3$ | 20 g | | 80 g | |
| NaCl | | 4.91 g | | 29.5 g |
| $H_2O$ to make | 120 ml | 85.7 ml | 480 ml | 514 ml |

Silver Halide Solvent (1)

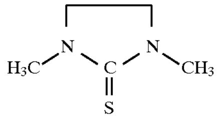

The mixture was washed with water and desalted (conducted using Precipitant (a) at a pH of 4.0) according to a usual method, and then 22 g of delimed gelatin was added and dispersed. After adjusting the pH to 6.0, 4 ml of a 10% aqueous solution of sodium chloride was added and further, 70 mg of Antiseptic (1) was added to obtain a silver chloride emulsion having a grain size of 0.15 μm. The yield of the emulsion was 630 g.

Precipitant (a)

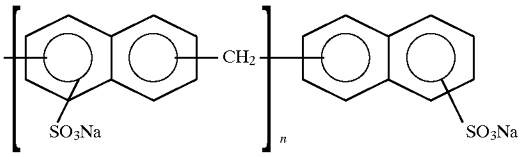

n = 3 ~ 4

Antiseptic (1)

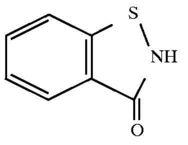

The preparation of Silver Halide Emulsion (II) is described below.

A silver chlorobromide emulsion having a silver chloride content of 70 mol % as Silver Halide Emulsion (II) was prepared in the same manner as Silver Halide Emulsion (I) except for changing the compositions of the aqueous gelatin solution, and Solutions (II) and (IV) as shown in Tables 3 and 4. The grain size was 0.18 μm.

TABLE 3

| Composition of Aqueous Gelatin Solution | |
|---|---|
| $H_2O$ | 650 ml |
| Lime-processed gelatin | 20 g |

TABLE 3-continued

| Composition of Aqueous Gelatin Solution | |
|---|---|
| NaCl | 3 g |
| KBr | 0.3 g |
| Silver Halide Solvent (1) | 0.015 g |
| Temperature | 40° C. |

TABLE 4

| | Solution (I) | Solution (II) | Solution (III) | Solution (IV) |
|---|---|---|---|---|
| $AgNO_3$ | 20 g | | 80 g | |
| NaCl | | 3.46 g | | 20.7 g |
| KBr | | 3.0 g | | 18.0 g |
| $H_2O$ to make | 120 ml | 85.7 ml | 480 ml | 514 ml |

On a polyethylene terephthalate support coated with polyvinyl chloride having carbon black dispersed therein as a back layer and having a thickness of 100 $\mu$m, gelatin was provided as a subbing layer. The first to eleventh layers each having the following composition were provided by a multiple-layer simultaneous coating method to prepare Color Light-Sensitive Material 1A. The components and the coating amounts (unit: g/m$^2$) are shown below. With respect to the silver halide and the colloidal silver emulsion, the coating amount is calculated in terms of silver.

| | |
|---|---|
| First Layer (peeling off layer): | |
| Hydroxyethyl cellulose (HEC-SP500; produced by Daicel Chemical Industries, Ltd.) | 0.35 |
| Terminal alkyl-modified polyvinyl alcohol (average polymerization degree: 300) | 0.08 |
| Antistatic Agent (Cpd-1) | 0.03 |
| Second Layer (gelatin adjacent layer): | |
| Gelatin | 1.20 |
| Third Layer (blue-sensitive layer): | |
| Silver Halide Emulsion (II) spectrally sensitized by Blue Sensitizing Dyes (ExS-1 and ExS-2) | 0.27 |
| Antifoggant (Cpd-2) | 0.01 |
| Gelatin | 0.45 |
| Cyan Coupler (ExC-2) | 0.51 |
| Magenta Coupler (ExM-1) | 0.04 |
| Discoloration Inhibitor (Cpd-3) | 0.02 |
| Discoloration Inhibitor (Cpd-4) | 0.001 |
| Discoloration Inhibitor (Cpd-5) | 0.003 |
| Ultraviolet Absorbent (Cpd-6) | 0.03 |
| Ultraviolet Absorbent (Cpd-7) | 0.08 |
| High Boiling Point Solvent (Solv-1) | 0.33 |
| High Boiling Point Solvent (Solv-2) | 0.02 |
| Fourth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Yellow Dye (YF-1) | 0.15 |
| Fifth Layer (infrared-sensitive Layer): | |
| Silver Halide Emulsion (I) spectrally sensitized by Red Sensitizing Dye (ExS-6) | 0.28 |
| Antifoggant (Cpd-12) | 0.008 |
| Gelatin | 0.63 |

-continued

| | |
|---|---|
| Cyan Coupler (ExC-2) | 0.10 |
| Magenta Coupler (ExM-1) | 0.14 |
| Yellow Coupler (ExY-1) | 0.35 |
| Discoloration Inhibitor (Cpd-3) | 0.05 |
| Discoloration Inhibitor (Cpd-4) | 0.005 |
| Discoloration Inhibitor (Cpd-5) | 0.02 |
| Ultraviolet Absorbent (Cpd-6) | 0.005 |
| Ultraviolet Absorbent (Cpd-7) | 0.01 |
| Stain Inhibitor (Cpd-13) | 0.01 |
| High Boiling Point Solvent (Solv-1) | 0.33 |
| High Boiling Point Solvent (Solv-2) | 0.07 |
| High Boiling Point Solvent (Solv-4) | 0.14 |
| Polymer (Cpd-14) | 0.01 |
| Sixth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Seventh Layer (green-sensitive layer): | |
| Silver Halide Emulsion (I) spectrally sensitized by Green Sensitizing Dye (ExS-3) | 0.38 |
| Gelatin | 0.61 |
| Cyan Coupler (ExC-1) | 0.33 |
| Yellow Coupler (ExY-2) | 0.42 |
| Discoloration Inhibitor (Cpd-5) | 0.01 |
| Ultraviolet Absorbent (Cpd-6) | 0.03 |
| Ultraviolet Absorbent (Cpd-7) | 0.06 |
| Stain Inhibitor (Cpd-13) | 0.02 |
| High Boiling Point Solvent (Solv-1) | 0.16 |
| High Boiling Point Solvent (Solv-2) | 0.21 |
| Polymer (Cpd-14) | 0.02 |
| Eighth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Irradiation Preventive Dye (Dye-1) | 0.005 |
| Irradiation Preventive Dye (Dye-2) | 0.02 |
| Ninth Layer (red-sensitive layer): | |
| Silver Halide Emulsion (I) spectrally sensitized by Red Sensitizing Dyes (ExS-4 and ExS-5) | 0.30 |
| Gelatin | 0.65 |
| Yellow Coupler (ExY-1) | 0.51 |
| Magenta Coupler (ExY-2) | 0.29 |
| Discoloration Inhibitor (Cpd-3) | 0.06 |
| Discoloration Inhibitor (Cpd-4) | 0.005 |
| Discoloration Inhibitor (Cpd-5) | 0.02 |
| Stain Inhibitor (Cpd-13) | 0.02 |
| Polymer (Cpd-14) | 0.02 |
| High Boiling Point Solvent (Solv-1) | 0.32 |
| High Boiling Point Solvent (Solv-2) | 0.08 |
| High Boiling Point Solvent (Solv-4) | 0.20 |
| Tenth Layer (interlayer): | |
| Gelatin | 0.31 |
| Eleventh Layer (protective layer): | |
| Gelatin | 0.70 |
| Colloidal silver emulsion (average particle size: 0.02 $\mu$m) | 0.20 |
| Polymer (Cpd-15) | 0.28 |
| Surface Active Agent (Cpd-16) | 0.05 |
| Hardening Agent (H-1) | 0.12 |

In each layer, sodium dodecylbenzenesulfonate as an emulsification dispersion aid, ethyl acetate as an auxiliary solvent, Surface Active Agent (Cpd-17) as a coating aid and potassium polystyrenesulfonate as a thickening agent were used.
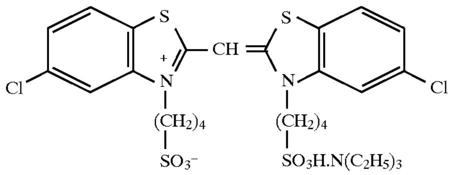
ExS-1
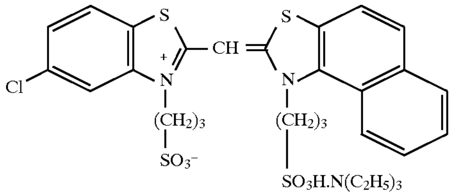
ExS-2
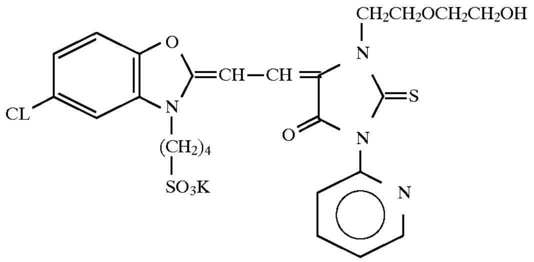
ExS-3
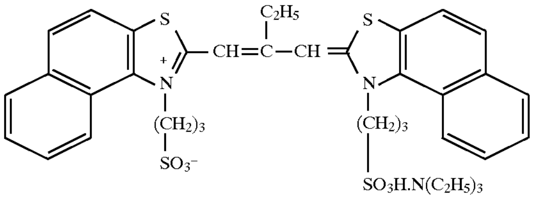
ExS-4
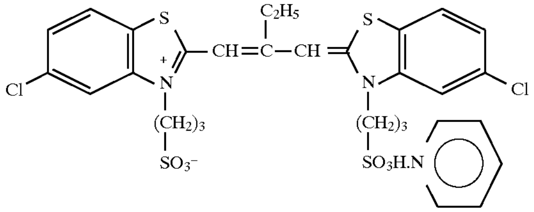
ExS-5
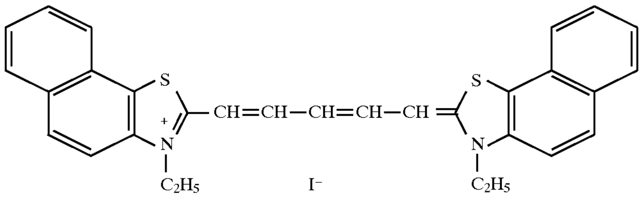
ExS-6
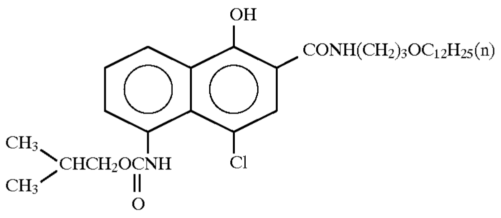
ExC-1

-continued
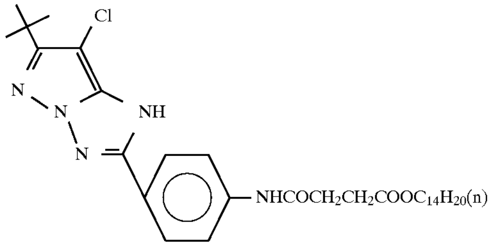
ExM-1
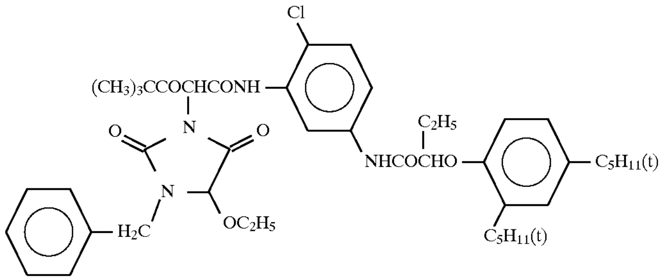
ExY-1
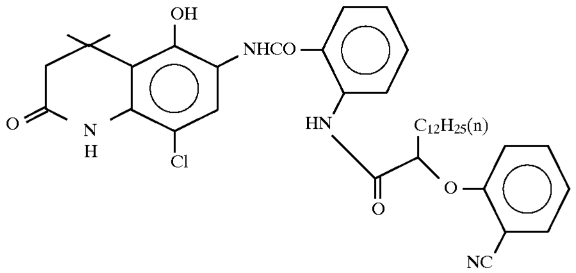
ExC-2
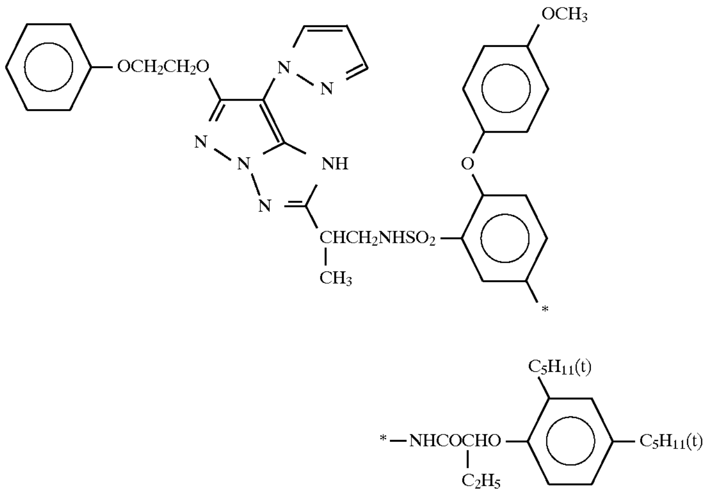
ExM-2
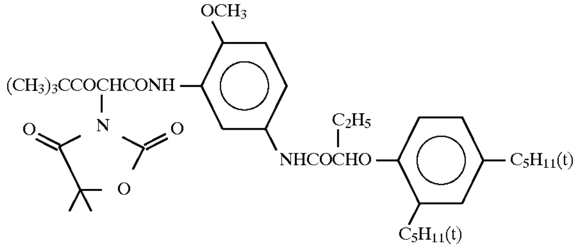
ExY-2
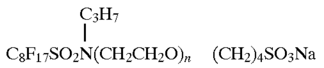
$n \approx 4.5$
Cpd-1

-continued
Cpd-2
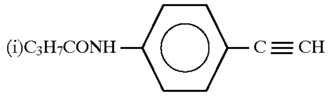
Cpd-3
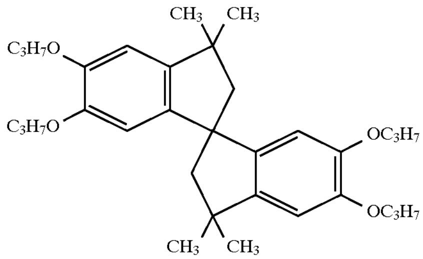
Cpd-4
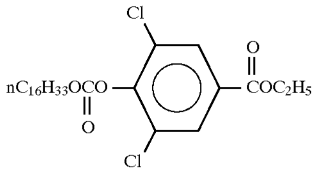
Cpd-5
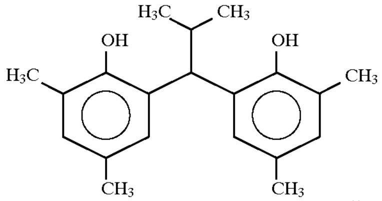
Cpd-6
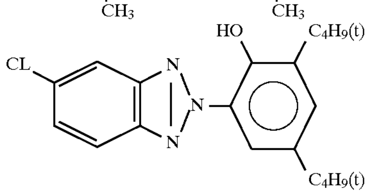
Cpd-7
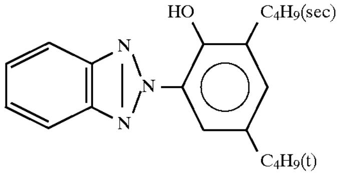
Cpd-8
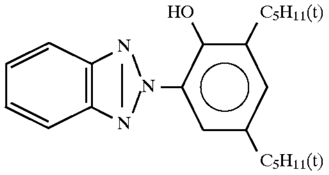
Cpd-9
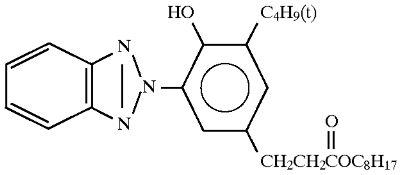
Cpd-10
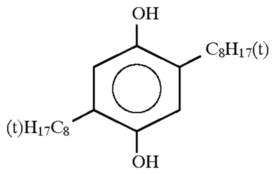

-continued
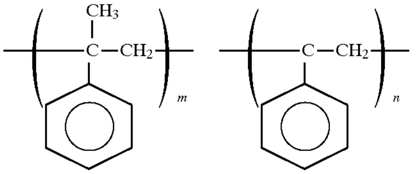
m/n = 9/1
Cpd-11
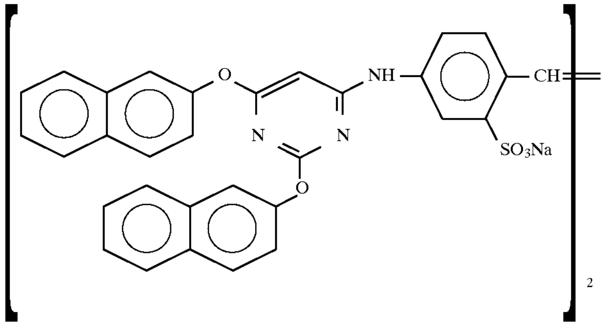
Cpd-12
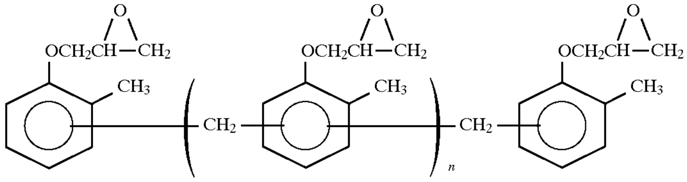
n = 7 ~ 8
Cpd-13
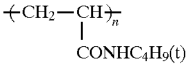
n = 100 ~ 100
Cpd-14
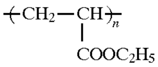
n = 100 ~ 100
Cpd-15
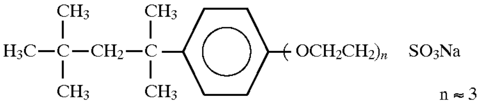
n ≈ 3
Cpd-16
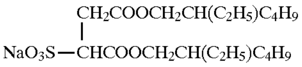
Cpd-17
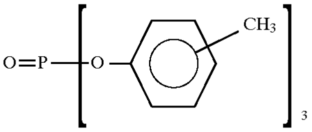
Solv-1
$O{=}P{+}O{-}C_8H_{17}(EH)]_3$
Solv-2
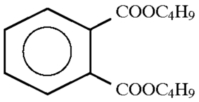
Solv-3
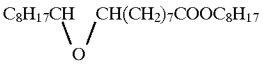
Solv-4

-continued

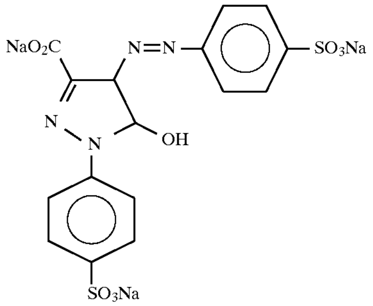

YF-1

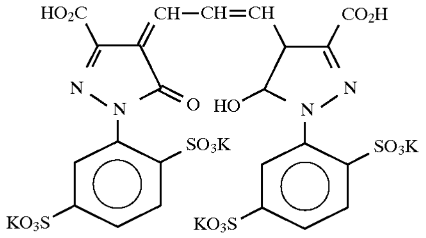

Dye-1

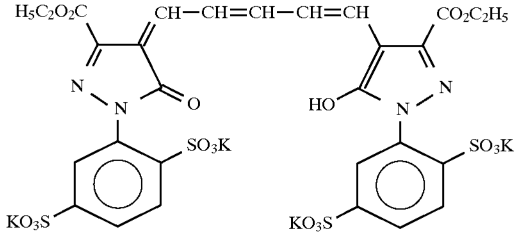

Dye-2

$CH_2{=}CHSO_2CH_2SO_2CH{=}CH_2$

H-1

As a light-transmitting substrate, a transparent alkali-free glass (20 cm×30 cm) having a thickness of 1.1 mm was used. Gelatin and colloidal silica (average particle size: 7 to 9 mμ) were mixed at a weight ratio of 1:3 and after adding thereto saponin as a surface active agent, the mixture was coated on the surface of the substrate to give a dry thickness of 0.2 μm.

On the coated surface of the light-transmitting substrate, the protective layer of the color-light sensitive material prepared above was firmly bonded. Thereafter, the laminate was passed through a laminator of which temperature was set so that the temperature on the bonded surface became about 130° C., at a linear velocity of 0.45 m/min. After leaving the laminate to cool almost to room temperature, the support of the light-sensitive material was peeled off together with the peeling-off layer from the emulsion surface. Then, the second and above emulsion layer surfaces were uniformly bonded onto the substrate and white spots were not observed.

On the thus-prepared substrate having emulsion layers, mask filters shown in FIG. 2 and a color filter in conformity to the spectral sensitivity of the light-sensitive material were superposed one on another and the substrate was exposed to tungsten light four times in sequence. The exposed substrate was color developed according to the following processing steps and after one operation, a color filter colored to three colors

| Processing Step | Temperature (°C.) | Time |
|---|---|---|
| Hardening | 38 | 3 min. |
| Water washing-1 | 35 | 1 min. |
| Color development | 38 | 80 sec. |
| Bleach-fixing | 38 | 90 sec. |
| Water washing-2 | 35 | 40 sec. |
| Water washing-3 | 35 | 40 sec. |
| Drying | 60 | 2 min. |

Each processing solution had the following composition.

| | |
|---|---|
| Hardening Solution: | |
| Sodium sulfate (anhydrous) | 160.0 g |
| Sodium carbonate (anhydrous) | 4.6 g |
| Glyoxal.propylene glycol adduct (55%) | 20.0 ml |
| Water to make | 1 l |
| pH (25° C.) | 9.5 |
| Color Developer: | |
| Water | 800 ml |
| Ethylenediaminetetraacetate | 3.0 g |
| Disodium 4,5-dihydroxybenzene-1,3-disulfonate | 0.5 g |
| Triethanolamine | 12.0 g |
| Potassium chloride | 6.5 g |
| Potassium bromide | 0.03 g |
| Potassium carbonate | 27.0 g |
| Sodium sulfite | 0.1 g |
| Disodium N,N-bis(sulfonatoethyl)-hydroxylamine | 5.0 g |

-continued

| | |
|---|---|
| Sodium triisopropylnaphthalene(β)-sulfonate | 0.1 g |
| N-Ethyl-N-(β-methanesulfonamidoethyl)-3-methyl-4-aminoaniline 3/2 sulfate monohydrate | 5.0 g |
| Water to make | 1 l |
| pH (25° C.) | 10.0 |
| Bleach-Fixing Solution: | |
| Water | 600 ml |
| Ammonium thiosulfate (750 g/l) | 93 ml |
| Ammonium sulfite | 40.0 g |
| Ammonium ethylenediaminetetraacetato ferrate | 55.0 g |
| Ethylenediaminetetraacetic acid | 5.0 g |
| Nitric acid (67%) | 30.0 g |
| Water to make | 1 l |
| pH (25° C.) | 5.8 |
| Washing Water: | |
| Deionized water having an electric conductivity of 5 μS or less | |

The thus-obtained Color Filter 1A was free of color turbidity, and had RGB excellent in spectral transmission characteristics and black stripes of substantially black having a transmission density of 3.0 or more.

EXAMPLE 2

Color Light-Sensitive Materials 2A to 7A were prepared in the same manner as Color Light-Sensitive Material 1A used in Example 1 except for changing the composition, the size and the coated silver amount of silver halide emulsions, the binder amount, and the amount of Color Mixing Inhibitor (Cpd-10) of the interlayers as shown in Table 5. Each of Color Light-Sensitive Materials 2A to 7A was processed in the same manner as Color Light-Sensitive Material 1A to prepare a color filter. Unless otherwise specified, the layers had the same composition as the layers of Light-Sensitive Material 1A. The density of Component Y, Component M and Component C on the G area of each color filter were measured and the results are shown in Table 6.

TABLE 5

| | 1A | 2A | 3A | 4A | 5A | 6A | 7A |
|---|---|---|---|---|---|---|---|
| Third Layer | | | | | | | |
| Silver halide · Composition | $AgBrCl_{70}$ | $AgBrCl_{70}$ | $AgBrCl_{20}$ | AgCl | AgCl | $AgBrCl_{20}$ | AgCl |
| Size (μm) | 0.18 | 1.10 | 1.10 | 0.08 | 0.08 | 1.10 | 0.15 |
| Coated silver amount | 0.27 | 0.51 | 0.51 | 0.19 | 0.19 | 0.51 | 0.27 |
| (*) | (1.6) | (3.0) | (3.0) | (1.1) | (1.1) | (3.0) | (1.6) |
| Gelatin amount | 0.45 | 0.45 | 0.45 | 0.45 | 0.67 | 0.30 | 0.45 |
| Fourth Layer | | | | | | | |
| Cpd-10 amount | 0.08 | 0.08 | 0.08 | 0.08 | 0.24 | 0.08 | 0.08 |
| Gelatin amount | 0.57 | 0.57 | 0.57 | 0.57 | 1.25 | 0.57 | 0.57 |
| Fifth Layer | | | | | | | |
| Silver halide · Composition | AgCl | AgCl | $AgBrCl_{60}$ | AgCl | AgCl | $AgBrCl_{60}$ | AgCl |
| Size (μm) | 0.15 | 0.85 | 0.85 | 0.04 | 0.04 | 0.85 | 0.15 |
| Coated silver amount | 0.28 | 0.44 | 0.44 | 0.19 | 0.19 | 0.44 | 0.28 |
| (*) | (1.6) | (2.5) | (2.5) | (1.1) | (1.1) | (2.5) | (1.6) |
| Gelatin Amount | 0.63 | 0.63 | 0.63 | 0.63 | 0.93 | 0.45 | 0.63 |
| Sixth Layer | | | | | | | |
| Cpd-10 amount | 0.08 | 0.08 | 0.08 | 0.08 | 0.24 | 0.08 | 0.08 |
| Gelatin amount | 0.57 | 0.57 | 0.57 | 0.57 | 1.25 | 0.57 | 0.57 |
| Seventh Layer | | | | | | | |
| Silver halide · Composition | AgCl | AgCl | $AgBrCl_{55}$ | AgCl | AgCl | $AgBrCl_{55}$ | AgCl |
| Size (μm) | 0.15 | 0.60 | 0.60 | 0.04 | 0.04 | 0.60 | 0.15 |
| Coated silver amount | 0.38 | 0.53 | 0.53 | 0.28 | 0.28 | 0.53 | 0.38 |
| (*) | (1.5) | (2.1) | (2.1) | (1.1) | (1.1) | (2.1) | (1.5) |
| Gelatin Amount | 0.61 | 0.61 | 0.61 | 0.61 | 0.91 | 0.45 | 0.61 |
| Eighth Layer | | | | | | | |
| Cpd-10 amount | 0.08 | 0.08 | 0.08 | 0.08 | 0.24 | 0.08 | 0.08 |
| Gelatin amount | 0.57 | 0.57 | 0.57 | 0.57 | 1.25 | 0.57 | 0.57 |
| Ninth Layer | | | | | | | |
| Silver halide · Composition | AgCl | AgCl | $AgBrCl_{65}$ | AgCl | AgCl | $AgBrCl_{65}$ | AgCl |
| Size (μm) | 0.15 | 0.65 | 0.65 | 0.04 | 0.04 | 0.65 | 0.15 |
| Coated silver amount | 0.30 | 0.42 | 0.42 | 0.22 | 0.22 | 0.42 | 0.30 |
| (*) | (1.5) | (2.1) | (2.1) | (1.1) | (1.1) | (2.1) | (1.5) |
| Gelatin Amount | 0.65 | 0.65 | 0.65 | 0.65 | 0.95 | 0.48 | 0.65 |
| Total binder amount on the substrate | 6.26 | 6.26 | 6.26 | 6.26 | 9.42 | 3.39 | 6.26 |

(*) shows an equivalent ratio to coupler

TABLE 6

| | Density on G area | | | |
|---|---|---|---|---|
| Color Filter No. | Y | M | C | Remarks |
| 1A | 1.08 | 0.15 | 1.02 | Invention |
| 2A | 1.10 | 0.30 | 1.03 | Comparison |
| 3A | 0.78 | 0.18 | 0.75 | Comparison |
| 4A | 1.02 | 0.56 | 0.99 | Comparison |
| 5A | 0.93 | 0.19 | 0.90 | Comparison |
| 6A | 0.99 | 0.32 | 1.00 | Comparison |
| 7A | 1.08 | 0.15 | 1.01 | Invention |

As seen in Table 6, since the development rate was lowered as the grain size of the silver halide emulsion became larger, the coated silver amount was increased to compensate for it and then the color turbidity of the light-sensitive material having a smaller amount of binder exhibited increased color turbidity (2A). When in the halogen composition of the silver halide emulsion, the proportion of silver chloride was reduced, the development rate was lowered (3A) and even if the development time was prolonged, the density was almost not increased though the fog was enlarged. When the amount of binder (gelatin) was reduced, the density was increased but the color turbidity increased (6A). On the other hand, when the grain size of silver halide emulsion was reduced to 0.05 μm or less, even if the coated silver amount was reduced (4A), the color turbidity could not be overcome. Further, when the binder amount or the amount of Color Mixing Inhibitor (Cpd-10) was increased, the color turbidity was lightened, however, at the same time, the density was reduced (5A). The samples according to the present invention provided the pixel image of good graininess as compared with the comparative samples.

According to the present invention, a color filter small in the layer thickness, almost free of color turbidity, excellent in the graininess and having red, green and blue areas having excellent spectral transmission characteristics, can be provided. Further, a color filter requiring no complicated process, less in the defects, suitable for the mass production and having a black area having a high optical density, can be provided.

EXAMPLE 3

A 100 μm-thick polyethylene terephthalate support coated with polyvinyl chloride containing carbon black dispersed therein as a back layer was subjected to gelatin subbing, and thereon, first to tenth layers each having the following composition were provided by a multiple-layer simultaneous coating method to prepare Color Light-Sensitive Material 1A'. The components and the coating amounts (unit: $g/m^2$) are shown below. With respect to silver halide, the coating amount is calculated in terms of silver.

| | |
|---|---|
| First Layer (peeling-off layer): | |
| Hydroxyethyl cellulose (HEC-SP500; produced by Daicel Chemical Industries, Ltd.) | 0.35 |
| Terminal alkyl-modified polyvinyl alcohol (average polymerization degree: 300) | 0.08 |
| Antistatic Agent (Cpd-1) | 0.03 |
| Second Layer (gelatin adjacent layer): | |
| Gelatin | 0.50 |

-continued

| | |
|---|---|
| Third Layer (blue-sensitive layer): | |
| Silver Halide Emulsion (II) spectrally sensitized by Blue Sensitizing Dyes (ExS-1 and ExS-2) | 0.27 |
| Antifoggant (Cpd-2) | 0.01 |
| Gelatin | 0.48 |
| Cyan Coupler (ExC-2) | 0.51 |
| Magenta Coupler (ExM-1) | 0.04 |
| Discoloration Inhibitor (Cpd-3) | 0.01 |
| Discoloration Inhibitor (Cpd-4) | 0.001 |
| Discoloration Inhibitor (Cpd-5) | 0.002 |
| Ultraviolet Absorbent (Cpd-6) | 0.03 |
| Ultraviolet Absorbent (Cpd-7) | 0.08 |
| High Boiling Point Solvent (Solv-1) | 0.25 |
| High Boiling Point Solvent (Solv-2) | 0.02 |
| Fourth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Polymer (Cpd-11) | 0.04 |
| Fifth Layer (infrared-sensitive Layer): | |
| Silver Halide Emulsion (II) spectrally sensitized by Red Sensitizing Dye (ExS-6) | 0.28 |
| Antifoggant (Cpd-12) | 0.005 |
| Gelatin | 0.57 |
| Cyan Coupler (ExC-2) | 0.10 |
| Magenta Coupler (ExM-1) | 0.14 |
| Yellow Coupler (ExY-1) | 0.35 |
| Discoloration Inhibitor (Cpd-3) | 0.05 |
| Discoloration Inhibitor (Cpd-4) | 0.005 |
| Discoloration Inhibitor (Cpd-5) | 0.02 |
| Ultraviolet Absorbent (Cpd-6) | 0.005 |
| Ultraviolet Absorbent (Cpd-7) | 0.01 |
| Stain Inhibitor (Cpd-13) | 0.01 |
| High Boiling Point Solvent (Solv-1) | 0.32 |
| High Boiling Point Solvent (Solv-2) | 0.07 |
| High Boiling Point Solvent (Solv-4) | 0.13 |
| Polymer (Cpd-14) | 0.01 |
| Sixth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Polymer (Cpd-11) | 0.04 |
| Yellow Dye (YF-1) | 0.15 |
| Seventh Layer (green-sensitive layer): | |
| Silver Halide Emulsion (I) spectrally sensitized by Green Sensitizing Dye (ExS-3) | 0.35 |
| Gelatin | 0.61 |
| Cyan Coupler (ExC-1) | 0.33 |
| Yellow Coupler (ExY-2) | 0.42 |
| Discoloration Inhibitor (Cpd-5) | 0.01 |
| Ultraviolet Absorbent (Cpd-6) | 0.03 |
| Ultraviolet Absorbent (Cpd-7) | 0.06 |
| Stain Inhibitor (Cpd-13) | 0.02 |
| High Boiling Point Solvent (Solv-1) | 0.16 |
| High Boiling Point Solvent (Solv-2) | 0.21 |
| Polymer (Cpd-14) | 0.02 |
| Eighth Layer (interlayer): | |
| Gelatin | 0.57 |
| Color Mixing Inhibitor (Cpd-10) | 0.08 |
| High Boiling Point Solvent (Solv-1) | 0.03 |
| High Boiling Point Solvent (Solv-3) | 0.01 |

-continued

| | |
|---|---|
| Ultraviolet Absorbent (Cpd-8) | 0.02 |
| Ultraviolet Absorbent (Cpd-7) | 0.02 |
| Ultraviolet Absorbent (Cpd-6) | 0.01 |
| Ultraviolet Absorbent (Cpd-9) | 0.02 |
| Stain Inhibitor (Cpd-11) | 0.04 |
| Irradiation Preventive Dye (Dye-1) | 0.005 |
| Irradiation Preventive Dye (Dye-2) | 0.02 |
| Ninth Layer (red-sensitive layer): | |
| Silver Halide Emulsion (I) spectrally sensitized by Red Sensitizing Dyes (ExS-4 and ExS-5) | 0.28 |
| Gelatin | 0.65 |
| Yellow Coupler (ExY-1) | 0.53 |
| Magenta Coupler (ExY-2) | 0.29 |
| Discoloration Inhibitor (Cpd-3) | 0.06 |
| Discoloration Inhibitor (Cpd-4) | 0.005 |
| Discoloration Inhibitor (Cpd-5) | 0.01 |
| Stain Inhibitor (Cpd-13) | 0.01 |
| Polymer (Cpd-14) | 0.02 |
| High Boiling Point Solvent (Solv-1) | 0.32 |
| High Boiling Point Solvent (Solv-2) | 0.08 |
| High Boiling Point Solvent (Solv-4) | 0.20 |
| Tenth Layer (protective layer): | |
| Gelatin | 0.70 |
| Antihalation dye (tine particle dispersion) | 0.15 |
| Carboxymethyl cellulose | 0.05 |
| Polymer (Cpd-15) | 0.14 |
| Surface Active Agent (Cpd-16) | 0.03 |
| Hardening Agent (H-1) | 0.12 |

In each layer, sodium dodecylbenzenesulfonate as an emulsification dispersion aid, ethyl acetate as an auxiliary solvent, Surface Active Agent (Cpd-17) as a coating aid and potassium polystyrenesulfonate as a thickening agent were used.

The silver halide emulsions and compounds used in each layer were the same as those used in Example 1. The antihalation dye used is shown below.

Antihalation Dye

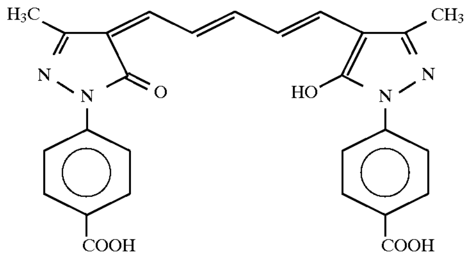

As a light-transmitting substrate, a transparent alkali-free glass (20 cm×30 cm) having a thickness of 1.1 mm was used. Gelatin and colloidal silica (average particle size: 7 to 9 m$\mu$) were mixed at a weight ratio of 1:3 and after adding thereto saponin as a surface active agent, the mixture was coated on the surface of the substrate to give a dry thickness of 0.2 $\mu$m.

On the coated surface of the light-transmitting substrate, the protective layer of the color-light sensitive material prepared above was firmly bonded. Thereafter, the laminate was passed through a laminator of which temperature was set so that the temperature on the bonded surface became about 130° C., at a linear velocity of 0.45 m/min. After leaving the laminate to cool almost to room temperature, the support of the light-sensitive material was peeled off together with the peeling-off layer from the emulsion surface. Then, the second and above emulsion layer surfaces were uniformly bonded onto the substrate and white spots were not observed.

On the thus-prepared substrate having emulsion layers, each mask filter shown in FIG. 2 and each color filter in conformity to each spectral sensitivity of the light-sensitive material were superposed to expose the light-sensitive material and the substrate was exposed to tungsten light four times in sequence. The exposed substrate was color developed in the same manner as in Example 1 to obtain a color filter colored to three colors of B, G and R and to black.

The resulting Color Filter 1A' was free of color turbidity and had RGB excellent in the spectral transmission characteristics and black stripes of high-density black.

Then, Color Filter 1A' was placed in an oven at 180° C. and heated for 2 hours. After the heating, Color Filter 1A' was observed through an optical microscope. It proved that the blurring was generated all over the surface and the boundary of respective picture elements was vague.

EXAMPLE 4

Color Light-Sensitive Materials 2A' to 6A' were prepared in the same manner as Color Light-Sensitive Material 1A' used in Example 3 except for changing the binder amount as shown in Table 7. Each material was processed by the same operation as in Example 3 to prepare a color filter, and each color filter was placed in an oven at 180° C. for 2 hours. The degree of blurring was observed through an optical microscope and the results are shown in Table 7.

TABLE 7

| | 1A' | 2A' | 3A' | 4A' | 5A' | 6A' |
|---|---|---|---|---|---|---|
| Third Layer | | | | | | |
| Polymer amount | 0.48 | 0.65 | 0.82 | 0.98 | 0.98 | 0.98 |
| Proportion (*) | 66 | 60 | 54 | 50 | 50 | 50 |
| Fourth Layer | | | | | | |
| Polymer amount | 0.61 | 0.61 | 0.61 | 0.61 | 0.37 | 0.20 |
| Proportion (*) | 24 | 24 | 24 | 24 | 34 | 57 |
| Fifth Layer | | | | | | |
| Polymer amount | 0.58 | 0.75 | 0.94 | 1.10 | 1.10 | 1.10 |
| Proportion (*) | 67 | 61 | 56 | 52 | 52 | 52 |
| Sixth Layer | | | | | | |
| Polymer amount | 0.61 | 0.61 | 0.61 | 0.61 | 0.37 | 0.20 |
| Proportion (*) | 35 | 35 | 35 | 35 | 48 | 67 |
| Seventh Layer | | | | | | |
| Polymer amount | 0.63 | 0.80 | 0.98 | 1.15 | 1.15 | 1.15 |
| Proportion (*) | 66 | 60 | 55 | 51 | 51 | 51 |
| Eighth Layer | | | | | | |
| Polymer amount | 0.61 | 0.61 | 0.61 | 0.61 | 0.37 | 0.20 |
| Proportion (*) | 26 | 26 | 26 | 26 | 37 | 60 |
| Ninth Layer | | | | | | |
| Polymer amount | 0.67 | 0.90 | 1.10 | 1.29 | 1.29 | 1.29 |
| Proportion (*) | 69 | 62 | 57 | 53 | 53 | 53 |
| Tenth Layer | | | | | | |
| Polymer amount | 0.89 | 0.89 | 0.89 | 0.89 | 0.45 | 0.35 |
| Proportion (*) | 25 | 25 | 25 | 25 | 40 | 46 |
| Degree of blurring (**) | ++ | + | ± | − | − | + |

Remarks: Polymer amount (g/m$^2$)
Proportion (*) proportion of organic compounds other than polymers to all organic compounds
Degree of blurring
++: heavy, +: light, ±: tolerable, −: no problem.

As seen in Table 7, the amount of binder (gelatin) in each silver halide emulsion layer of Color Light-Sensitive Material 1A' was relatively small and the proportion of organic compounds other than polymers to all organic compounds greatly exceeded 55% by weight. In Color Light-Sensitive Materials 2A' to 4A' where the gelatin amount in each silver halide emulsion layer was increased, the blurring due to heating was outstandingly reduced and when the proportion of organic compounds other than polymers to all organic compounds was 55% by weight or less, the degree of blurring was on a level almost free of problems. However, when the gelatin amount in each silver halide emulsion layer was increased, the layer thickness of color filter increased and other problems as described above were caused. In Color Light-Sensitive Material 5A' where the gelatin in the interlayer was reduced and the gelatin amount in each silver halide emulsion layer was increased, the blurring was not generated due to heating, the color turbidity was not observed and RGB excellent in spectral transmission characteristics and black stripes of high-density black were exhibited. In Color Light-Sensitive Material 6A' where the gelatin in the interlayer was further reduced and in order to inhibit the color mixing resulting therefrom, the amount of Color Mixing Inhibitor (Cpd-10) was increased to 2 times in each interlayer, the blurring was generated due to heating and the color turbidity became heavy. Hence, it is proved that when the proportion of organic compounds other than polymers to all organic compounds exceeds 55% by weight even in a light-insensitive interlayer, the blurring due to heating and the color turbidity are generated.

EXAMPLE 5

Color Light-Sensitive Materials 3B and 3C were prepared in the same manner as Color Light-Sensitive Material 3A' of Example 4 except for replacing 40% by weight of gelatin used as a binder in each silver halide emulsion layer by a terminal alkyl-modified polyvinyl alcohol having an average polymerization degree of 300 and polyvinylpyrrolidone K-90, respectively. Each material was processed to prepare a color filter and the blurring of picture elements due to heating was observed in the same manner as in Example 3. As a result, the level of blurring of each filter was tolerable.

According to the present invention, a color filter small in the layer thickness, almost free of blurring of picture elements, and having red, green and blue areas having excellent spectral transmission characteristics, can be provided. Further, a color filter requiring no complicated process, less in the defects, suitable for the mass production and having a black area having a high optical density, can be provided.

While the invention has been described in detail and with reference to specific embodiments thereof, it will be apparent to one skilled in the art that various changes and modifications can be made therein without departing from the spirit and scope thereof.

What is claimed is:

1. A method for preparing a color filter having a pixel pattern composed of blue, green and red colors, comprising subjecting a silver halide light-sensitive material to pattern exposure, color development and desilvering, the silver halide light-sensitive material comprising a support having provided thereon at least three silver halide emulsion layers containing couplers and having color sensitivities different from each other and at least one light-insensitive interlayer, wherein the total amount of binder in the silver halide light-sensitive material is from 3 to 10 g/$m^2$, the equivalent ratio of silver halide to couplers in each silver halide emulsion layer is from 1 to 2, and the average grain size of silver halide (in the case of tabular grains, determined by the thickness) in each silver halide emulsion is from 0.05 to 0.9 $\mu$m.

2. The method for preparing a color filter of claim 1, wherein the proportion of organic compounds other than polymers to all organic compounds in each silver halide emulsion layer is 55% by weight or less.

3. A color filter prepared according to the method of claim.

4. A color filter prepared according to a method which comprises subjecting a silver halide light-sensitive material to pattern exposure, color development and desilvering, the silver halide light-sensitive material comprising a support having provided thereon at least three silver halide emulsion layers containing couplers and having color sensitivities different from each other and at least one light-insensitive interlayer, wherein the total amount of binder in the silver halide light-sensitive material is from 3 to 10 g/$m^2$, the equivalent ratio of silver halide to couplers in each silver halide emulsion layer is from 1 to 2, and the average grain size of silver halide (in the case of tabular grains, determined by the thickness) in each silver halide emulsion is from 0.05 to 0.9 $\mu$m.

* * * * *